(12) United States Patent
Sasaki

(10) Patent No.: US 11,385,604 B2
(45) Date of Patent: Jul. 12, 2022

(54) POLICY IMPROVEMENT METHOD, RECORDING MEDIUM, AND POLICY IMPROVEMENT APPARATUS

(71) Applicant: FUJITSU LIMITED, Kawasaki (JP)

(72) Inventor: Tomotake Sasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 16/810,329

(22) Filed: Mar. 5, 2020

(65) Prior Publication Data

US 2020/0285205 A1    Sep. 10, 2020

(30) Foreign Application Priority Data

Mar. 7, 2019 (JP) ............................. JP2019-041997

(51) Int. Cl.
| | | |
|---|---|---|
| G05B 13/02 | (2006.01) | |
| G06N 20/00 | (2019.01) | |
| G06N 5/02 | (2006.01) | |
| G06F 17/12 | (2006.01) | |
| F24F 11/63 | (2018.01) | |

(Continued)

(52) U.S. Cl.
CPC ........ G05B 13/0265 (2013.01); B25J 9/1658 (2013.01); F24F 11/63 (2018.01); G06F 17/12 (2013.01); G06N 5/022 (2013.01); G06N 20/00 (2019.01); H02J 3/381 (2013.01); *H02J 2300/28* (2020.01)

(58) Field of Classification Search
CPC .... G05B 13/0265; G06N 20/00; G06N 5/022; G06N 3/006; F24F 11/63; B25J 9/1658; H02J 3/381; H02J 2300/28; G06F 17/12; G06F 17/13
See application file for complete search history.

(56) References Cited

U.S. PATENT DOCUMENTS

2019/0130337 A1* 5/2019 Nafus .................... H04L 67/12
2020/0210575 A1* 7/2020 Huang ................... G06N 3/088

FOREIGN PATENT DOCUMENTS

JP       2007-065929 A     3/2007
JP       2014-206795 A    10/2014

OTHER PUBLICATIONS

Tomotake Sasaki et al., "Policy Gradient Reinforcement Learning Method for Discrete-Time Linear Quadratic Regulation Problem Using Estimated State Value Function" 2017 56th Annual Conference of the Society of Instrument and Control Engineers of Japan (SICE), Kanazawa, 2017, pp. 653-657 (Total 5 pages).

(Continued)

*Primary Examiner* — Charles R Kasenge
(74) *Attorney, Agent, or Firm* — Fujitsu Patent Center

(57) ABSTRACT

A policy improvement method of improving a policy of reinforcement learning by a state value function, is executed by a computer and includes adding a plurality of perturbations to a plurality of components of a first parameter of the policy; estimating a gradient function of the state value function with respect to the first parameter, based on a result of an input determination performed for a control target in the reinforcement learning, the input determination being performed by using the policy that uses a second parameter obtained by adding the plurality of perturbations to the plurality of components; and updating the first parameter based on the estimated gradient function.

10 Claims, 12 Drawing Sheets

(51) Int. Cl.
  *B25J 9/16* (2006.01)
  *H02J 3/38* (2006.01)

(56) References Cited

OTHER PUBLICATIONS

Yunmin Zhu et al., "Recursive Least Squares With Linear Constraints" Communications in Information and Systems, vol. 7, No. 3, pp. 287-312, 2007 (Total 26 pages).
Christoph Dann et al., "Policy Evaluation with Temporal Differences: A Survey and Comparison" Journal of Machine Learning Research, vol. 15, pp. 809-883, 2014 (Total 75 pages).

* cited by examiner

POLICY IMPROVEMENT METHOD, RECORDING MEDIUM, AND POLICY IMPROVEMENT APPARATUS

CROSS REFERENCE TO RELATED APPLICATIONS

This application is based upon and claims the benefit of priority of the prior Japanese Patent Application No. 2019-041997, filed on Mar. 7, 2019, the entire contents of which are incorporated herein by reference.

FIELD

The embodiments discussed herein relate to a policy improvement method, a recording medium, and a policy improvement apparatus.

BACKGROUND

According to a conventional reinforcement learning technique, policy improvement is carried out so that a value function representing cumulative cost or cumulative reward is improved and cumulative cost or cumulative reward is optimized based on immediate cost or immediate reward that results according to input for a control target. The value function is a state-action value function (Q function) or a state value function (V function), etc.

As a prior art, for example, according to one technique, an update amount of a model parameter of a policy function approximated by a linear model with state information $s_t$, state information $s_{t+1}$, action information $a_t$, action information $a_{t+1}$, and reward information no is obtained and the model parameter is updated. For example, according to another technique, a process of providing a control signal to a control target is performed, temporal difference (TD) error is obtained from results of observation of a state of the control target, a TD error approximator is updated, and a policy is updated. For examples of such techniques, refer to Japanese Laid-Open Patent Publication No. 2014-206795 and Japanese Laid-Open Patent Publication No. 2007-65929.

SUMMARY

According to an aspect of an embodiment, a policy improvement method of improving a policy of reinforcement learning by a state value function, is executed by a computer and includes adding a plurality of perturbations to a plurality of components of a first parameter of the policy; estimating a gradient function of the state value function with respect to the first parameter, based on a result of an input determination performed for a control target in the reinforcement learning, the input determination being performed by using the policy that uses a second parameter obtained by adding the plurality of perturbations to the plurality of components; and updating the first parameter based on the estimated gradient function.

An object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF THE INVENTION

First, problems associated with the conventional techniques will be discussed. In the conventional techniques, a problem arises in that the number of input determinations in a process of updating a parameter of a policy easily increases and the processing load easily increases. For example, in cases where components of the parameter are selected one-by-one and with a perturbation added to only the selected component, the parameter is updated based on a result of the number of times determination of the input is performed, the greater is the number of components of the parameter, the greater is the number of times determination of the input is performed.

Embodiments of a policy improvement method, a policy improvement program, and a policy improvement apparatus according to the present invention will be described in detail with reference to the accompanying drawings.

Figure 1:
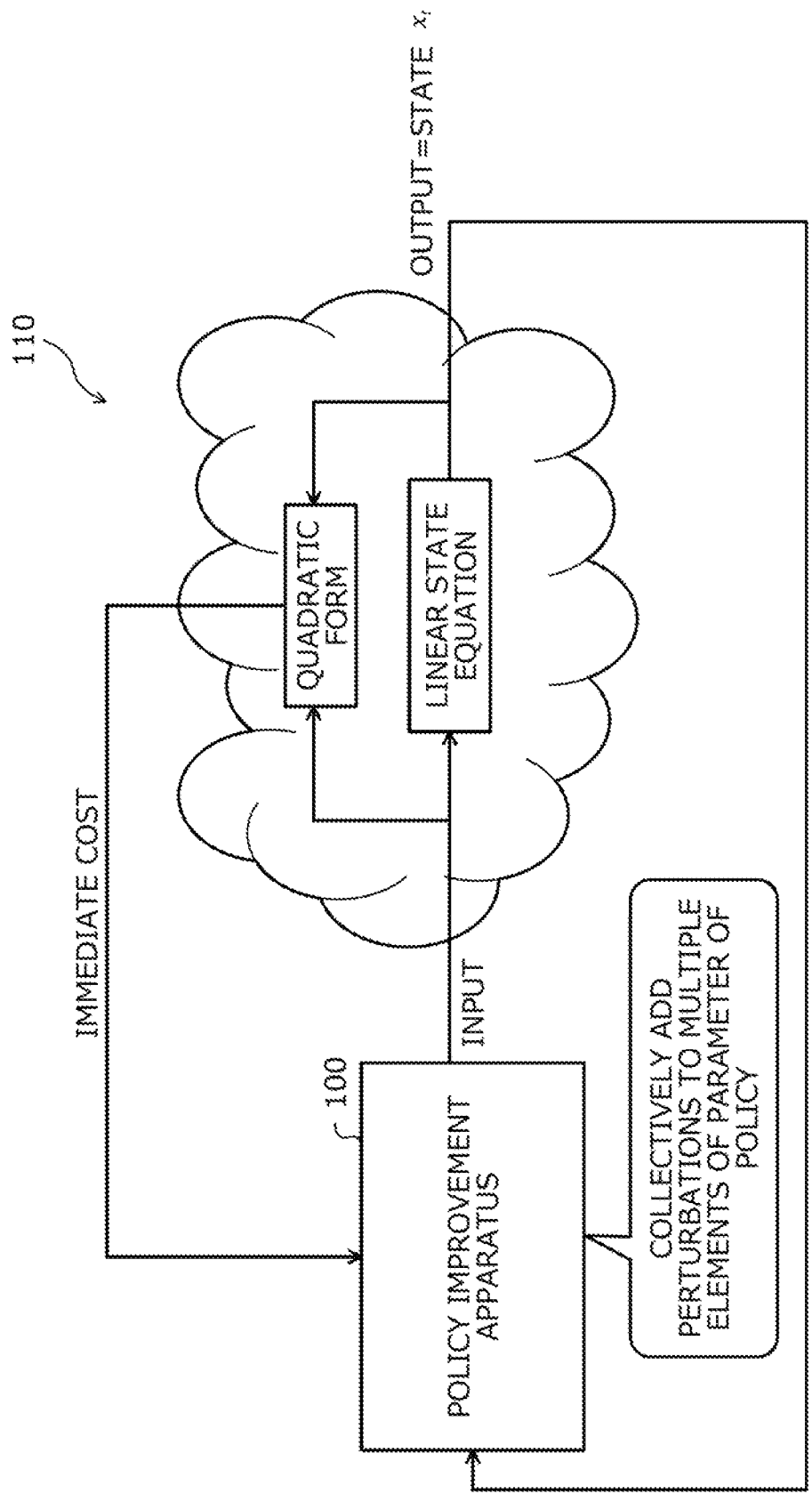
FIG. 1 is a diagram depicting an example of a policy improvement method according an embodiment.

FIG. 1 is a diagram depicting an example of the policy improvement method according to an embodiment. A policy improvement apparatus 100 is a computer that improves a policy at a predetermined timing, determines an input for a control target 110 by the policy, and thereby, controls the control target 110. The policy improvement apparatus 100 is, for example, a server, a personal computer (PC), a microcontroller, etc.

The control target 110 is any event/matter that is a control target and, for example, is a physical system that actually exists. The control target 110 is further called an environment. The control target 110, in particular, is a server room, power generation facility, or an industrial machine. The policy is an equation that determines an input value for the control target 110 by a predetermined parameter. The policy is further called a control law. The predetermined parameter, for example, is a feedback coefficient matrix.

Policy improvement corresponds to updating a parameter of the policy. Policy improvement means to alter the policy so that cumulative cost and/or cumulative reward are optimized with greater efficiency. The input is an operation with respect to the control target 110. The input is further called an action. A state of the control target 110 changes according to the input for the control target 110.

Here, to optimize the cumulative cost and/or the cumulative reward, preferably, a parameter of the policy tends to be changed along a direction of a gradient of the state value function. In this respect, with consideration of T. Sasaki, E. Uchibe, H. Iwane, H. Yanami, H. Anai and K. Doya, "Policy gradient reinforcement learning method for discrete-time linear quadratic regulation problem using estimated state value function," 2017 56th Annual Conference of the Society of Instrument and Control Engineers of Japan (SICE), Kanazawa, 2017, pp. 653-657, a first control scheme of controlling the control target 110 by facilitating policy improvement through updating of a parameter of the policy is conceivable.

The first control scheme, for example, is a control scheme in which components of a parameter of a policy are selected one-by-one and with a perturbation added only to the selected component, a gradient function matrix of a state value function is estimated based on results of multiple input determinations of determining input. Accordingly, the first control scheme enables a parameter of the policy to be changed in a direction along a gradient of the state value function.

Nonetheless, the first control scheme is problematic in that, in a process of updating the parameter of the policy, the number of times that determination of the input is performed easily increases and the processing load easily increases. The first control scheme, for example, determines the input multiple times for each component of the parameter of the policy and therefore, in proportion to the number of components of the parameter of the policy, the number of times that the input is determined increases, inviting increases in the processing load and processing time. The first control scheme further stands by for a predetermined period corresponding to determination of the input, thereby inviting increases in the number of times a process of observing the immediate cost or the immediate reward is performed as well as increases in the processing load and in the processing time.

Thus, in the present embodiment, a policy improvement method will be described in which perturbations are added simultaneously to plural components of a parameter of a policy, a gradient function matrix of a state value function is estimated based on a result of determining an input for the control target 110, and the parameter of the policy is updated. According to the policy improvement method, in a process of updating the parameter of the policy, the number of times determination of the input (input determination) is performed may be reduced.

In the example depicted in FIG. 1, state changes of the control target 110 are represented by a discrete-time linear time-invariant deterministic state equation while coefficient matrices in the state equation of the control target 110 and coefficient matrices in a quadratic form representing how immediate cost or immediate reward occurs are unknown. Further, regarding the control target 110, the output is the state of the control target 110 and the state of the control target 110 is directly observable.

In the example depicted in FIG. 1, a state change of the control target 110 is defined by a linear difference equation, and immediate cost or immediate reward of the control target 110 is defined by a quadratic form of input to the control target 110 and the state of the control target 110.

(1-1) The policy improvement apparatus 100 adds perturbations to multiple components of a first parameter of a policy. The first parameter, for example, is a feedback coefficient matrix. The multiple components, for example, are all components of the first parameter. The policy improvement apparatus 100, for example, adds a perturbation matrix to the feedback coefficient matrix and thereby, adds perturbations to all of the components of the feedback coefficient matrix. A specific example of adding the perturbations, for example, will be described hereinafter with reference to FIG. 10. Accordingly, it becomes possible to estimate a gradient function of the state value function.

(1-2) The policy improvement apparatus 100 determines the input for the control target 110 by the policy that uses a second parameter obtained by adding perturbations to the multiple components. Further, based on a result of determining the input for the control target 110, the policy improvement apparatus 100 estimates a gradient function of the state value function for the first parameter. The second parameter corresponds to a result of adding the perturbations to the multiple components of the first parameter.

For example, based on a result of determining input for the control target 110, the policy improvement apparatus 100 calculates a TD error for an estimation state value function that is an estimated state value function. Next, based on the TD error and the perturbations, the policy improvement apparatus 100 generates an estimation gradient function matrix that is an estimated gradient function matrix of the state value function with respect to the feedback coefficient matrix for the state. A specific example of generation the estimation gradient function matrix, for example, will be described hereinafter with reference to FIGS. 10 and 11.

Here, the policy improvement apparatus 100 repeatedly performs addition of perturbations to multiple components of the first parameter and input determination for the control target 110 multiple times. Subsequently, based on results obtained for each execution of the input determination for the control target 110, the policy improvement apparatus 100 estimates the gradient function. As a result, the policy improvement apparatus 100 may obtain an estimation of a partial differential representing a reaction degree for the perturbations with respect to the components of the feedback coefficient matrix and may use the obtained estimation of the partial differential to generate the estimation gradient function matrix in which an arbitrary state is substitutable.

(1-3) The policy improvement apparatus 100 uses the estimated gradient function to update the first parameter. The policy improvement apparatus 100, for example, uses the generated estimation gradient function matrix to update the feedback coefficient matrix. A specific example of updating the feedback coefficient matrix, for example, will be described hereinafter with reference to FIG. 12. Accordingly, the policy improvement apparatus 100 may update the feedback coefficient matrix based on an estimated value of the estimation gradient function matrix in which an arbitrary state is substituted.

As a result, the policy improvement apparatus 100 may judge what type of perturbation matrix will optimize the cumulative cost and/or the cumulative reward when added to the feedback coefficient matrix. Further, the policy improvement apparatus 100 may reduce the number of input determinations for updating the feedback coefficient matrix and may reduce the number of times the process of standing by for a predetermined period corresponding to the input determination and observing the immediate cost or the immediate reward is performed. Therefore, the policy improvement apparatus 100 may reduce the processing load and the processing time.

As a result, the policy improvement apparatus 100 improves the state value function and may update the feedback coefficient matrix so that the cumulative cost and/or the cumulative reward are efficiently optimized and may efficiently improve the policy. Improvement of the state value function in a case of cumulative cost is when a value of the value function in all states is smaller and in a case of cumulative reward, is when the value of the value function is larger in all states.

Here, while a case has been described in which the policy improvement apparatus 100 adds perturbations to all of the components of the first parameter, without limitation hereto, for example, the policy improvement apparatus 100 may divide the components of the first parameter into groups and add perturbations to the components, for each group. A group, for example, is a group of components in units of rows or a group of components in units of columns. The group, for example, may be a group of components of an upper triangular part and/or a lower triangular part.

An example of a hardware configuration of the policy improvement apparatus 100 depicted in FIG. 1 will be described with reference to FIG. 2.

Figure 2:
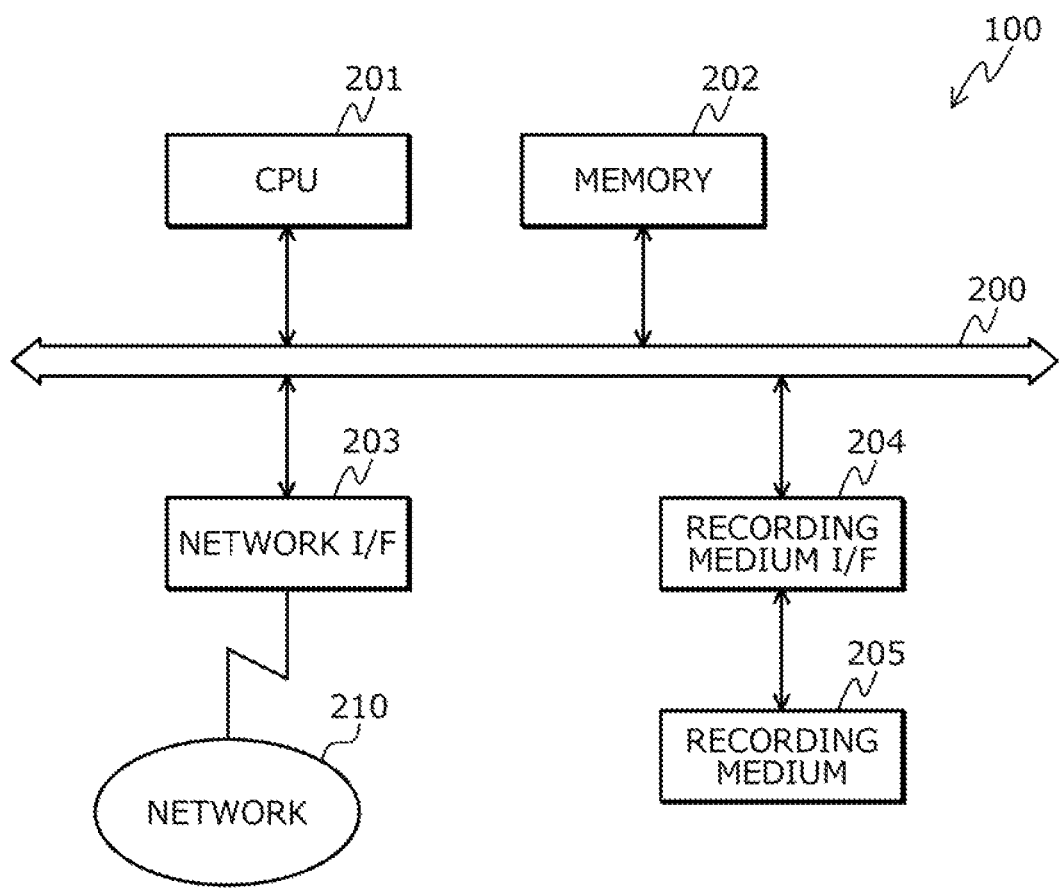
FIG. 2 is a block diagram of an example of a hardware configuration of a policy improvement apparatus 100.

FIG. 2 is a block diagram of the example of the hardware configuration of the policy improvement apparatus 100. In FIG. 2, the policy improvement apparatus 100 has a central processing unit (CPU) 201, a memory 202, a network interface (I/F) 203, a recording medium I/F 204, and a recording medium 205, each connected by a bus 200.

Here, the CPU 201 governs overall control of the policy improvement apparatus 100. The memory 202, for example, includes a read only memory (ROM), a random access memory (RAM) and a flash ROM, etc. In particular, for example, the flash ROM and the ROM store various types of programs therein and the RAM is used as work area of the CPU 201. The programs stored in the memory 202 are loaded onto the CPU 201, whereby encoded processes are executed by the CPU 201.

The network I/F 203 is connected to a network 210 through a communications line and connected to another computer via the network 210. Further, the network I/F 203 administers an internal interface with the network 210 and controls the input and output of data from another computer. The network I/F 203, for example, is a modem, a local area network (LAN) adapter, etc.

The recording medium I/F 204 controls reading and writing with respect to the recording medium 205, under the control of the CPU 201. The recording medium I/F 204, for example, is a disk drive, a solid state drive (SSD), a universal serial bus (USB) port, etc. The recording medium 205 is a non-volatile memory storing data written thereto under the control of the recording medium I/F 204. The recording medium 205, for example, is a disk, a semiconductor memory, a USB memory, etc. The recording medium 205 may be removable from the policy improvement apparatus 100.

The policy improvement apparatus 100, for example, may have a keyboard, a mouse, a display, a touch panel, a printer, a scanner, a microphone, a speaker, etc. in addition to the components described above. Further, the policy improvement apparatus 100 may have the recording medium I/F 204 and/or the recording medium 205 in plural. Further, the policy improvement apparatus 100 may omit the recording medium I/F 204 and/or the recording medium 205.

An example of a functional configuration of the policy improvement apparatus 100 will be described with reference to FIG. 3.

Figure 3:
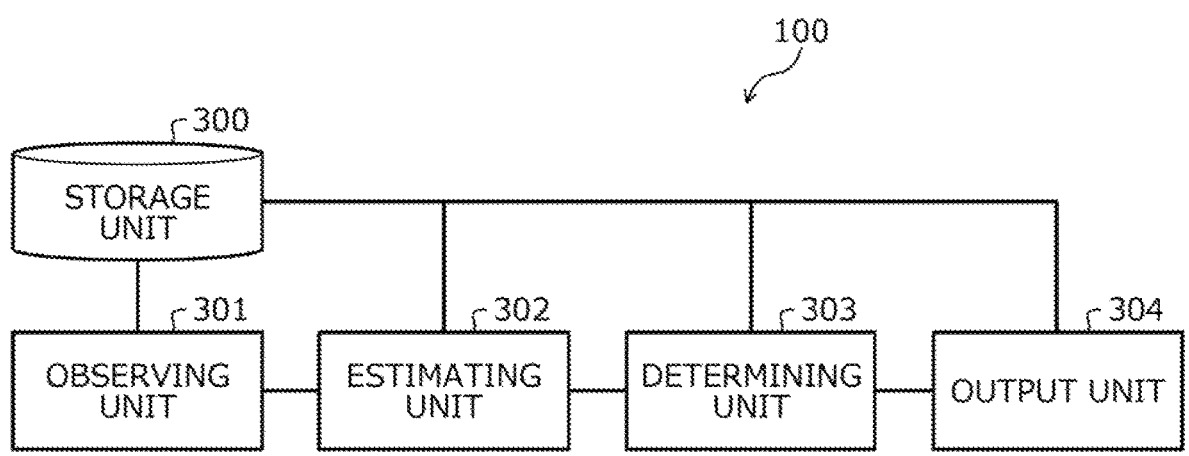
FIG. 3 is a block diagram of an example of a functional configuration of the policy improvement apparatus 100.

FIG. 3 is a block diagram of the example of the functional configuration of the policy improvement apparatus 100. The policy improvement apparatus 100 includes a storage unit 300, an observing unit 301, an estimating unit 302, a determining unit 303, and an output unit 304.

The storage unit 300, for example, is realized by the memory 202 and/or the recording medium 205 depicted in FIG. 2. Hereinafter, an instance in which the storage unit 300 is included in the policy improvement apparatus 100 will be described, however, without limitation hereto, for example, the storage unit 300 may be included in an apparatus different from the policy improvement apparatus 100 and stored contents of the storage unit 300 may be referenced by the policy improvement apparatus 100.

The observing unit 301 to the output unit 304 function as a control unit. The observing unit 301 to the output unit 304, in particular, for example, realize functions thereof by execution of a program stored in a memory area of the memory 202 or the recording medium 205 depicted in FIG. 2, on the CPU 201 or by the network I/F 203. Processing results of the functional units, for example, are stored to a storage area such as the memory 202 or the recording medium 205 depicted in FIG. 2.

The storage unit 300 is referred to in processes of the functional units and stores various types of updated information. The storage unit 300 accumulates inputs, states, and immediate costs or immediate rewards of the control target 110. As a result, the storage unit 300 enables the estimating unit 302 and the determining unit 303 to refer to the inputs, the states, and the immediate costs or the immediate rewards of the control target 110.

The control target 110, for example, may be air conditioning equipment. In this case, the input, for example, is at least one of a set temperature of the air conditioning equipment and set air volume of the air conditioning equipment. The state, for example, is at least one of a temperature of a room having the air conditioning equipment, a temperature outside the room having the air conditioning equipment, and the weather. The cost, for example, is energy consumption of the air conditioning equipment. An instance in which the control target 110 is the air conditioning equipment will be particularly described with reference to FIG. 5 hereinafter.

The control target 110, for example, may be a power generation facility. The power generation facility, for example, is a wind power generation facility. In this case, the input, for example, is torque of a generator of the power generation facility. The state, for example, is at least one of a generated energy amount of the power generation facility, rotation amount of a turbine of the power generation facility, rotational speed of the turbine of the power generation facility, wind direction with respect to the power generation facility, and wind speed with respect to the power generation facility. The reward, for example, is the generated energy amount of the power generation facility. An instance in which the control target 110, for example, is the power generation facility will be particularly described with reference to FIG. 6 hereinafter.

The control target 110, for example, may be an industrial robot. In this case, the input, for example, is torque of a motor of the industrial robot. The state, for example, is at least one of an image taken by the industrial robot, a position of a joint of the industrial robot, an angle of a joint of the industrial robot, and angular speed of a joint of the industrial robot. The reward, for example, is a production amount of the industrial robot. The production amount, for example, is an assembly count. The assembly count, for example, is the number of products assembled by the industrial robot. An instance in which the control target 110 is the industrial robot will be particularly described with reference to FIG. 7 hereinafter.

The storage unit 300 may store a parameter of a policy. For example, the storage unit 300 stores the first parameter of the policy. The first parameter, for example, is the feedback coefficient matrix. As a result, the storage unit 300 may store the first parameter of the policy, updated at a predetermined timing. Further, the storage unit 300 enables the first parameter of the policy to be referenced by the estimating unit 302.

The observing unit 301 observes and outputs to the storage unit 300, the state and, the immediate cost or the immediate reward of the control target 110. As a result, the observing unit 301 enables states and, immediate costs or immediate rewards of the control target 110 to be accumulated by the storage unit 300.

The estimating unit 302 updates the estimation state value function that is an estimated state value function. For example, the estimating unit 302 uses batch least squares, recursive least squares, a batch least-squares temporal difference (LSTD) algorithm, a recursive LSTD algorithm, etc. to update a coefficient of the estimation state value function and thereby, updates the estimation state value function.

In particular, the estimating unit 302 updates the estimation state value function by updating a coefficient of the estimation state value function at step S804 described hereinafter with reference to FIG. 8. As a result, the estimating unit 302 may use the estimation state value function to update the first parameter of the policy. Further, the estimating unit 302 may improve the state value function.

Y. Zhu and X. R. Li, "Recursive least squares with linear constraints," Communications in Information and Systems, Vol. 7, No. 3, pp. 287-312, 2007 or Christoph Dann and Gerhard Neumann and Jan Peters, "Policy Evaluation with Temporal Differences: A Survey and Comparison," Journal of Machine Learning Research, Vol. 15, pp. 809-883, 2014 may be referred to regarding batch least squares, recursive least squares, a batch LSTD algorithm, a recursive LSTD algorithm, and the like.

The estimating unit 302 adds perturbations to multiple components of the first parameter of the policy. The perturbation added to each of the multiple components is determined independently for each and is determined so that the probabilities of a perturbation having a positive value or a negative value are equal where the absolute values of the positive value and the negative value are equal. The estimating unit 302 determines input for the control target 110 by the policy that uses the second parameter that is obtained by adding the perturbations to the multiple components.

For example, the estimating unit 302 adds the perturbations to all of the components of the first parameter. In particular, the estimating unit 302 generates a perturbation matrix of a size similar to that of the feedback coefficient matrix and adds the perturbation matrix to the feedback coefficient matrix to thereby, add the perturbations to all of the components of the feedback coefficient matrix.

Further, the estimating unit 302 may repeatedly perform input determination for the control target 110 multiple times by adding perturbations to the multiple components of the first parameter and using the policy that uses the second parameter that is obtained by adding the perturbations to the multiple components. In the description hereinafter, an instance in which the estimating unit 302 repeatedly performs the input determination will be described.

For example, the estimating unit 302 adds perturbations to all of the components of the first parameter and performs the input determination multiple times. In particular, the estimating unit 302 generates a perturbation matrix of a size equal to that of the feedback coefficient matrix, adds the perturbation matrix to the feedback coefficient matrix to thereby, add the perturbations to all of the components of the feedback coefficient matrix and performs the input determination, repeatedly, multiple times. More specifically, the estimating unit 302 adds perturbations to all of the components of the feedback coefficient matrix repeatedly multiple times at steps S1001, S1003 depicted in FIG. 10 described hereinafter.

Further, for example, the estimating unit 302 may divide the components of the first parameter into groups and for each group, may add perturbations to the components. Of the multiple groups, at least one of the groups includes multiple components. The multiple groups may include a group that includes one component, not two or more. A group, for example, is a group of components in units of rows or a group of components in units of columns. A group, for example, may be a group of components of an upper triangular part and/or a lower triangular part.

Next, by the policy that uses the second parameter that is obtained by adding the perturbations to the multiple components, the estimating unit 302 estimates the gradient function of the state value function with respect to the first parameter, based on a result of determining input for the control target 110 in reinforcement learning. The second parameter corresponds to results of adding the perturbations to the multiple components of the first parameter. For example, the estimating unit 302 estimates the gradient function based on a result obtained for each input determination performed for the control target 110.

In particular, the estimating unit 302 calculates a corresponding TD error for each execution of the input determination, based on the result obtained by the execution of the input determination for the control target 11. Next, for each of the components of the first parameter, the estimating unit 302 divides the TD error corresponding to the execution of the input determination by a corresponding perturbation added to the component. Further, the estimating unit 302 associates the obtained quotients and results of differentiating the state value function by each component and thereby, estimates the gradient function.

More specifically, the estimating unit 302 calculates a corresponding TD error for each execution of the input determination, based on a result obtained by the execution of the input determination for the control target 11. Next, for each component of the feedback coefficient matrix, the estimating unit 302 divides the corresponding TD error for the execution of the input determination, by the perturbation added to the component.

Subsequently, the estimating unit 302 associates the obtained quotients and results of differentiating the state value function by the components of the feedback coefficient matrix and thereby, generates estimation components estimating components of the gradient function matrix. The estimation gradient function matrix is a matrix that estimates the gradient function matrix of the state value function with respect to the first parameter for the state of the control target 110.

Here, the estimating unit 302 defines the results of differentiating the state function by the components of the feedback coefficient matrix by a mathematical product of a vector dependent on the state and a vector independent of the state. Further, the estimating unit 302 utilizes a property of state change of the control target 110 described by the linear difference equation and a property of the immediate cost or the immediate reward of the control target 110 described by the quadratic form of the input and the state.

More specifically, for example, the estimating unit 302, at step S1004 depicted in FIG. 10 described hereinafter and at steps S1101, S1102 depicted in FIG. 11 described hereinafter, may generate corresponding to the perturbations, TD errors for the estimation state value function that is an estimated state value function. As a result, the estimating unit 302 may obtain an estimation of the partial differential representing a reaction degree for the perturbations for the components of the first parameter of the policy.

More specifically, for example, the estimating unit 302, at steps S1103 to S1107 depicted in FIG. 11 described hereinafter, generates estimation components that are estimated components of the gradient function matrix in a format that enables substitution of an arbitrary state. Further, the estimating unit 302, at step S1201 depicted in FIG. 12 described hereinafter, generates the estimation gradient function matrix that is an estimated gradient function matrix.

Here, the estimating unit 302 uses later described equation (24) formed by associating results of dividing TD errors generated for the components of the feedback coefficient matrix by the perturbations, with results of differentiating the state value function by the components of the feedback coefficient matrix.

Here, when generating the estimation components estimating the components of the gradient function matrix, the estimating unit 302 may use batch least squares, recursive least squares, a batch LSTD algorithm, a recursive LSTD algorithm, or the like. As a result, the estimating unit 302 may generate the estimation gradient function matrix in which an arbitrary state is substitutable.

The estimating unit 302 uses the estimated gradient function and updates the first parameter. For example, the estimating unit 302 uses the generated estimation gradient function matrix and updates the feedback coefficient matrix. In particular, the estimating unit 302 uses the estimation gradient function matrix and updates the feedback coefficient matrix at step S1202 depicted in FIG. 12 described hereinafter. As a result, the estimating unit 302 may update the feedback coefficient matrix based on an estimated value of the estimation gradient function matrix into which the state has been substituted.

The determining unit 303 determines the input value for the control target 110, based on the policy that uses the updated feedback coefficient matrix. As a result, the determining unit 303 may determine the input value that optimizes the cumulative cost and/or the cumulative reward.

The output unit 304 outputs processing results of at least one of the functional units. A form of output, for example, is display to a display, print out to a printer, transmission to an external apparatus by the network I/F 203, or storage to a storage region of the memory 202, the recording medium 205, etc.

For example, the output unit 304 outputs determined input values to the control target 110. As a result, the output unit 304 may control the control target 110. Further, for example, the output unit 304 outputs determined input values to the storage unit 300. As a result, the output unit 304 stores the input values to the storage unit 300, enabling referencing by the estimating unit 302 and the determining unit 303.

An example of the reinforcement learning will be described with reference to FIG. 4.

Figure 4:
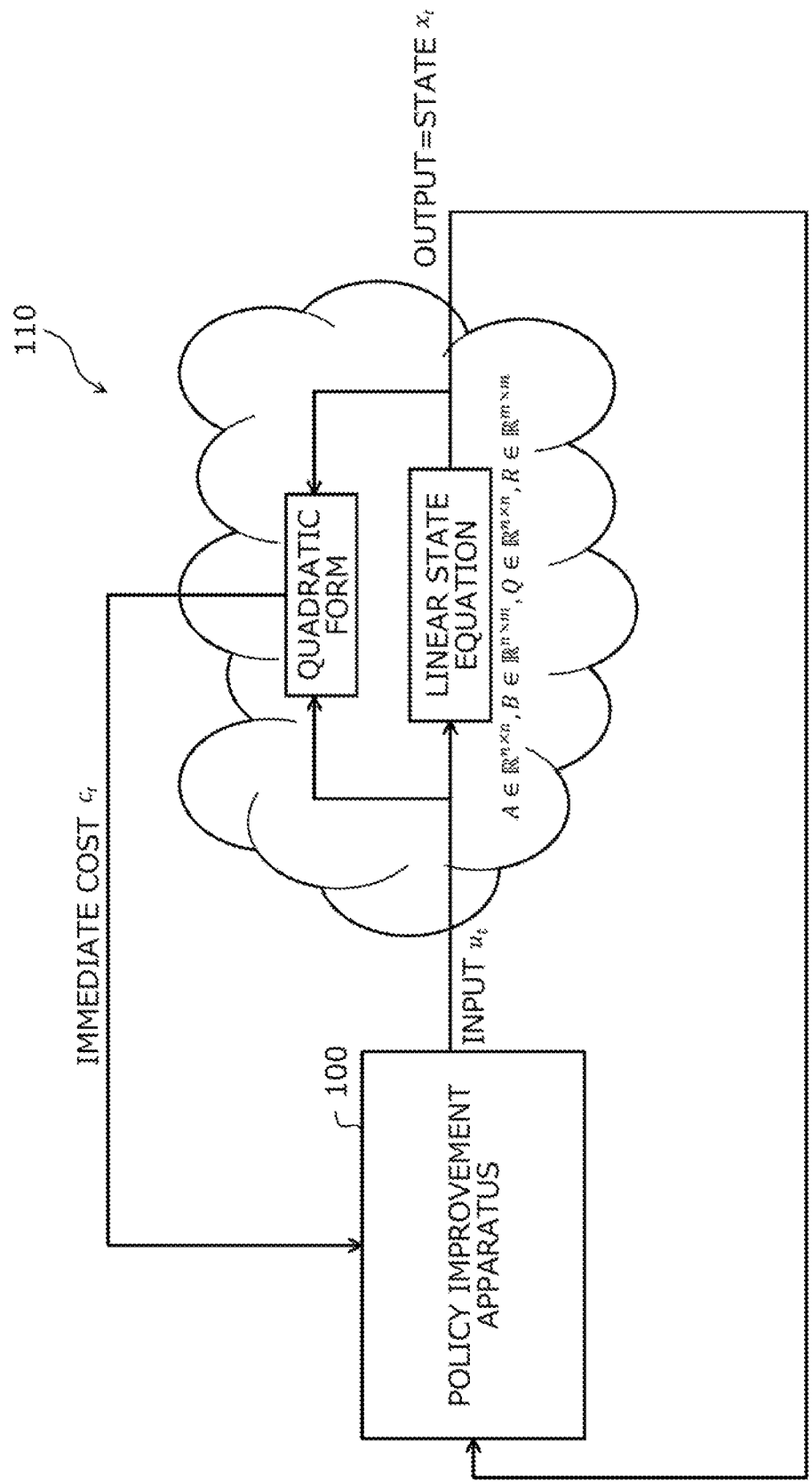
FIG. 4 is a diagram depicting an example of reinforcement learning.

FIG. 4 is a diagram depicting an example of the reinforcement learning. As depicted in FIG. 4, in the example, by equations (1) to (9), the state equation of the control target 110, a quadratic equation of the immediate cost, the objective function, and the policy are defined and problem setting is performed. In the example, the state of the control target 110 is directly observable.

$$x_{t+1} = Ax_t + Bu_t \tag{1}$$

Equation (1) is the state equation of the control target 110, where t is a time point indicated in a multiple of a unit time; t+1 is a subsequent time point when a unit time elapses from the time point t; $x_{t+1}$ is the state at the subsequent time point t+1; $x_t$ is the state at the time point t; and $u_t$ is the input at time point t. Further, A, B are the coefficient matrices. Equation (1) indicates that the state $x_{t+1}$ at the subsequent time point t+1 has a relationship with and is determined by the state $x_t$ at the time t and the input $u_t$ at the time t. The coefficient matrices A, B are unknown.

$$x_0 \in \mathbb{R}^n \tag{2}$$

Equation (2) indicates that the state $x_0$ is n-dimensional, where n is known. An outline letter R indicates real coordinate space. A superscript character of the outline letter R indicates the number of dimensions.

$$u_t \in \mathbb{R}^m, t=0,1,2, \tag{3}$$

Equation (3) indicates that the input $u_t$ is m-dimensional.

$$A \in \mathbb{R}^{n \times n}, \mathbb{R} \in \mathcal{B}^{n \times m} \tag{4}$$

Equation (4) indicates that the coefficient matrix A has a dimension of n×n (n rows by n columns) and the coefficient matrix B has a dimension of n×m (n rows by m columns). (A, B) is assumed to be stabilizable.

$$c_t = c(x_t, u_t) = x_t^T Q x_t + u_t^T R u_t \tag{5}$$

Equation (5) is an equation of the immediate cost incurred by the control target 110, where $c_t$ is the immediate cost occurring after a unit time, according to the input $u_t$ at the time point t and "T" superscript indicates transposition. Equation (5) indicates that the immediate cost $c_t$ is related to and is determined by the quadratic form of the state $x_t$ at time point t and the quadratic form of the input $u_t$ at the time point t. Coefficient matrices Q, R are unknown. The immediate cost $c_t$ is directly observable.

$$Q \in \mathbb{R}^{n \times n}, Q = Q^T \geq 0, R \in \mathbb{R}^{m \times m}, R = R^T > 0 \tag{6}$$

Equation (6) indicates that the coefficient matrix Q has a dimension of n×n and ≥0 indicates the coefficient matrix Q is a positive semi-definite matrix. Further, equation (6) indicates that the coefficient matrix R has a dimension of m×m and >0 indicates that the coefficient matrix R is a positive definite matrix.

$$V = \sum_{t=0}^{\infty} \gamma^t c_t \tag{7}$$

Equation (7) is an equation representing a cumulative cost V. An objective of the reinforcement learning is minimization of the cumulative cost V. γ is a discount rate, where γ is a value within the range of 0 to 1.

$$u_t = F_t x_t \tag{8}$$

Under equations (1) to (7), the policy of minimizing the cumulative cost V is expressed by equation (8). Accordingly, in the description hereinafter, the policy may be expressed by equation (8). $F_t$ is the feedback coefficient matrix used at the time point t and represents a coefficient matrix related to the state $x_t$. Equation (8) is an equation that determines the input $u_t$ for the time point t, based on the state $x_t$ at the time point t.

$$F_t \in \mathbb{R}^{m \times n}, t=0,1,2, \tag{9}$$

Equation (9) indicates that a feedback coefficient matrix $F_t$ has a dimension of m×n. In the description hereinafter, the feedback coefficient matrix $F_t$ may be indicated as simply "the feedback coefficient matrix F". Next, with consideration of T. Sasaki, et al, "Policy gradient reinforcement learning method for discrete-time linear quadratic regulation problem using estimated state value function" cited above, a specific example of updating the feedback coefficient matrix F will be described.

When the policy is expressed by equation (8) and control of the control target 110 by the reinforcement learning begins from a state x at a time point 0, the cumulative cost V is expressed by a state value function v(x:F) that is a function of the feedback coefficient matrix F and the state x.

Here, to minimize the cumulative cost V, the feedback coefficient matrix F is preferably changed along a direction of a gradient function matrix $\nabla_F v(x:F)$ with respect to the feedback coefficient matrix F of the state value function v(x:F).

In contrast, according to T. Sasaki, et al, "Policy gradient reinforcement learning method for discrete-time linear quadratic regulation problem using estimated state value function" cited above, a control scheme α is considered in which components of the feedback coefficient matrix F are selected one-by-one and with a perturbation added only to the selected component, input determination is performed, the gradient function matrix $\nabla_F v(x:F)$ is estimated, the feedback coefficient matrix F is updated. Here, the control scheme α will be discussed in detail.

The control scheme α repeatedly performs N' times, addition of a perturbation to an (i,j) component $F_{ij}$ of the feedback coefficient matrix F by a formula of the feedback coefficient matrix $F+\varepsilon E_{ij}$ and input determination. (i,j) is an index specifying a matrix component. The index (i,j), for example, specifies a component of an i-th row and a j-th column of matrix F. $E_{ij}$ is an m×n-dimensional matrix in which the component specified by the index (i,j) is 1 and other components thereof are 0. ε is a real number that is not 0.

The control scheme α performs the input determination using the feedback coefficient matrix $F+\varepsilon E_{ij}$ instead of $F_t$ in equation (8). In this case, the state value function v(x:F) is expressed by equation (10).

$$v(x:F+\varepsilon E_{ij}) = v(x:F) + \frac{\partial v}{\partial F_{ij}}(x:F)\varepsilon + O(\varepsilon^2) \quad (10)$$

As a result, the TD error corresponding to the determined input may be expressed by a partial differential coefficient of the state value function with respect to the (i,j) component $F_{ij}$ of the feedback coefficient matrix F.

Furthermore, when the state change of the control target 110 is according to linear time-invariant deterministic dynamics and the immediate cost is expressed in a quadratic form, the state value function v(x:F) is expressed in a quadratic form as in equation (11).

$$v(x:F) = x^T P_F x \quad (11)$$

Therefore, a function $\partial v/\partial F_{ij}(x:F)$ obtained by partially differentiating the state value function v(x:F) for the (i,j) component $F_{ij}$ of the feedback coefficient matrix F is expressed in a quadratic form as in equation (12). In the description hereinafter, a function derived by partial differentiation may be indicated as a "partial derivative".

$$\frac{\partial v}{\partial F_{ij}}(x:F) = x^T \frac{\partial P_F}{\partial F_{ij}} x \quad (12)$$

The control scheme α uses a vector $\theta_{F_{ij}}^F$ obtained by equation (12) and equation (13) to calculate an estimation function for the partial derivative $\partial v/\partial F_{ij}(x:F)$ with respect to the (i,j) component $F_{ij}$ of the feedback coefficient matrix F. A symbol in which "o" and "x" are superimposed on each other represents the Kronecker product. The Kronecker product indicated as a superscript indicates the Kronecker product of the same variables. A numeral appended to the Kronecker product indicated as a superscript indicates the number of the Kronecker products. $\delta_F(x:\varepsilon E_{ij})$ is the TD error.

$$\frac{1}{\varepsilon}\delta_F(x:\varepsilon E_{ij}) \simeq [x^{\otimes 2} - \gamma\varphi_{+1}(x:F+\varepsilon E_{ij})^{\otimes 2}]^T \theta_{F_{ij}}^F \quad (13)$$

In the description hereinafter, the estimation function, for example, may be indicated in a formula, by appending "^" above the partial derivative $\partial v/\partial F_{ij}(x:F)$ such as in equation (14). Further, the estimation function may be indicated in the description as "hat{$\partial v/\partial F_{ij}(x:F)$}".

$$\widehat{\frac{\partial v}{\partial F_{ij}}}(x:F) \quad (14)$$

The control scheme α, similarly, for other components of the feedback coefficient matrix F, adds perturbations and repeatedly performs the input determination N' times, and calculates the estimation function hat{$\partial v/\partial F_{ij}(x:F)$} for the partial derivative $\partial v/\partial F_{ij}(x:F)$. Subsequently, the control scheme α uses the estimation function hat{$\partial v/\partial F_{ij}(x:F)$} for the partial derivative $\partial v/\partial F_{ij}$ to generate the estimation gradient function matrix, which is an estimated gradient function matrix $\nabla_F v(x:F)$ of the feedback coefficient matrix.

In the description hereinafter, the estimation gradient function matrix, for example, may be indicated in a formula, by appending "^" above the gradient function matrix $\nabla_F v(x:F)$ such as in equation (15). Further, the estimation gradient function matrix, for example, may be indicated in the description as "hat{$\nabla_F v(x:F)$}".

$$\widehat{\nabla_F v}(x:F) \quad (15)$$

As a result, the control scheme α updates the feedback coefficient matrix F based on the estimation gradient function matrix hat{$\nabla_F v(x:F)$} obtained by estimating the gradient function matrix $\nabla_F v(x:F)$.

Nonetheless, the control scheme α performs the input determination N' times for each component of the feedback coefficient matrix F and therefore, performs the input determination n×m×N' times until the feedback coefficient matrix F is updated. Further, since the control scheme α performs the input determination n×m×N' times, the control scheme α stands by for a predetermined period corresponding to the input determination, whereby the number of times the process of observing the immediate cost or immediate reward is performed may increase. As a result, the control scheme α invites increases in the processing load and the processing time.

Accordingly, facilitating reduction of the number of times the input determination is performed and reductions in the processing load and the processing time is desirable. In contrast, a specific example of facilitating a reduction of the number of times that the input determination is performed and enabling updating of the feedback coefficient matrix F by the policy improvement apparatus 100 adding perturbations to all of the components of the feedback coefficient matrix F simultaneously to perform the input determination will be described.

Here, for example, an instance is considered in which perturbations are added to all of the components of the feedback coefficient matrix F simultaneously by adding a perturbation matrix ρ of a size similar to that of the feedback coefficient matrix F. In this instance, the feedback coefficient matrix F+ρ is used instead of $F_t$ in equation (8) to perform the input determination and therefore, the state value function v(x:F) is expressed by equation (16), where ρ=[$ρ_{ij}$] $\in R^{m \times n}$ and |$ρ_{ij}$|≤ε≤1.

$$v(x:F+\varepsilon\rho) = v(x:F) + \sum_{i,j} \frac{\partial v}{\partial F_{ij}}(x:F)\rho_{ij} + O(\varepsilon^2) \quad (16)$$

Equation (16) includes a sum of a partial differential coefficient ∂v/∂$F_{ij}$(x:F)$ρ_{ij}$ with respect to the (i,j) component $F_{ij}$ of the feedback coefficient matrix F as an extra term. An extra term is a term that adversely affects the estimation of the gradient function matrix $\nabla_F$v(x:F). Therefore, when the estimation gradient function matrix hat{$\nabla_F$v(x:F)} is obtained by estimating the gradient function matrix $\nabla_F$v(x:F) of the feedback coefficient matrix F based on TD errors, it is desirable for the extra term to be negligible.

In contrast, the policy improvement apparatus 100 stochastically generates, as the perturbation matrix ρ, a perturbation matrix Δ=[$Δ_{ij}$] having a first property and a second property, uses the feedback coefficient matrix F+εΔ instead of $F_t$ of equation (8), and repeatedly performs the input determination N' times.

The first property has a property of Prob($Δ_{ij}$=1)=Prob ($Δ_{ij}$=−1)=½, for all i=1, . . . , m; j=1, . . . , n. In other words, a perturbation $Δ_{ij}$ is determined so that the perturbation $Δ_{ij}$ has an equal probability of being a positive value or a negative value where the absolute values of the positive value and the negative value are equal. Here, the absolute value=1. The second property has a property of the perturbations $Δ_{ij}$ being determined independently of each other. In the description hereinafter, to explicitly indicate the perturbation matrix Δ or the perturbation $Δ_{ij}$ generated at the time point t, a "t" subscript may be appended.

When the feedback coefficient matrix F+εΔ is used instead of $F_t$ of equation (8) and the input determination is performed, the state value function v(x:F) is expressed by equation (17).

$$v(x:F+\varepsilon\Delta) = v(x:F) + \sum_{i,j} \frac{\partial v}{\partial F_{ij}}(x:F)\Delta_{ij}\varepsilon + O(\varepsilon^2) \quad (17)$$

When both sides of equation (17) are divided by $Δ_{ij}$=1 or −1, equation (18) is obtained. In equation (18), ∂v/∂$F_{ij}$(x:F)ε without an extra coefficient appears. ∂v/∂$F_{ij}$(x:F)ε is the same term that appears in equation (10).

$$\frac{1}{\Delta_{ij}} v(x:F+\varepsilon\Delta) = \quad (18)$$
$$\frac{1}{\Delta_{ij}} v(x:F) + \frac{\partial v}{\partial F_{ij}}(x:F)\varepsilon + \sum_{(i',j') \neq (i,j)} \frac{\partial v}{\partial F_{i'j'}}(x:F)\frac{\Delta_{i'j'}}{\Delta_{ij}}\varepsilon + O(\varepsilon^2)$$

Further, equation (19) that corresponds to equation (13) may be obtained based on equation (18).

$$\frac{1}{\varepsilon\Delta_{ij}}\delta_F(x:\varepsilon\Delta) \simeq [x^{\otimes 2} - \gamma\varphi_{+1}(x:F+\varepsilon\Delta)^{\otimes 2}]^T \theta^F_{Fij} + \quad (19)$$
$$\sum_{(i',j') \neq (i,j)} [x^{\otimes 2} - \gamma\varphi_{+1}(x:F+\varepsilon\Delta)^{\otimes 2}]^T \theta^F_{Fij} \frac{\Delta_{i'j'}}{\Delta_{ij}}$$

Equation (19) includes a term that is the same as that in equation (13). On the other hand, equation (19) includes an extra term different from equation (13). Here, the extra term is an Σ term. However, from the first property and the second property above, the Σ term has an initial value 0 with respect to an arbitrary x and is independent with respect to a different x.

Therefore, according to the Gauss-Markov theorem, even when the policy improvement apparatus 100 uses equation (19) instead of equation (13), the policy improvement apparatus 100 may accurately calculate the estimation function hat{∂v/∂$F_{ij}$(x:F)} for the partial derivative ∂v/∂$F_{ij}$(x:F).

Subsequently, the policy improvement apparatus 100 may generate the estimation gradient function matrix by using the estimation function hat{∂v/∂$F_{ij}$(x:F)} of the partial derivative ∂v/∂$F_{ij}$ to estimate the gradient function matrix $\nabla_F$v(x:F) of the feedback coefficient matrix.

Therefore, the policy improvement apparatus 100 may update the feedback coefficient matrix F based on the estimation gradient function matrix hat{$\nabla_F$v(x:F)} obtained by estimating the gradient function matrix $\nabla_F$v(x:F). A specific example of updating the feedback coefficient matrix F will be described hereinafter with reference to FIGS. 8 to 12.

Thus, the policy improvement apparatus 100 may generate an estimation matrix for a matrix ∂$P_F$/∂$F_{ij}$ in a form separate from the state x. Therefore, the policy improvement apparatus 100 may calculate the estimation gradient function matrix hat{$\nabla_F$v(x:F)} obtained by estimating the gradient function matrix $\nabla_F$v(x:F) at a certain time point, in a format that enables substitution of an arbitrary state x. Further, when calculating an estimated value of the gradient function matrix $\nabla_F$v(x:F) for a certain state at a subsequent time point, the policy improvement apparatus 100 may perform the calculation by substituting the state into the estimation gradient function matrix hat{$\nabla_F$v(x:F)} already calculated.

In this manner, rather than an estimated value of the gradient function matrix $\nabla_F$v(x:F) for a certain state x, the policy improvement apparatus 100 may generate the estimation gradient function matrix hat{$\nabla_F$v(x:F)} that is an estimated gradient function matrix $\nabla_F$v(x:F) that is usable at a subsequent time point. Therefore, the policy improvement apparatus 100 may calculate estimated values of the gradient function matrix $\nabla_F$v(x:F) relatively easily for various states and may facilitate reduction of the processing amount.

Further, the policy improvement apparatus 100 may generate the estimation gradient function matrix hat{$\nabla_F$v(x:F)} by estimating the gradient function matrix $\nabla_F$v(x:F) based on a state actually observed, an immediate cost, or an input. Therefore, the policy improvement apparatus 100 may accurately generate the estimation gradient function matrix hat{$\nabla_F$v(x:F)} obtained by estimating the gradient function matrix $\nabla_F$v(x:F).

Further, the policy improvement apparatus 100 may update the feedback coefficient matrix F so that the cumulative cost is efficiently optimized. Therefore, the policy improvement apparatus 100 may facilitate reduction of the time necessary until the state of the control target 110 is a desirable state. Compared to a technique of reinforcement learning not using the gradient function matrix $\nabla_F v(x:F)$, the policy improvement apparatus 100, for example, may facilitate reduction of the time necessary until the state of the control target 110 is a desirable state.

Further, the policy improvement apparatus 100 may adjust the degree of change of the feedback coefficient matrix F, when updating the feedback coefficient matrix F based on the estimation gradient function matrix hat$\{\nabla_F v(x:F)\}$ obtained by estimating the gradient function matrix $\nabla_F v(x:F)$. Therefore, the policy improvement apparatus 100 may prevent the control target 110 from being adversely affected by sudden changes of the feedback coefficient matrix F.

For example, a case is conceivable in which the degree of change of the feedback coefficient matrix F is not adjustable even at a stage when the state value function is not accurately estimated. In this case, the feedback coefficient matrix F suddenly changes, becoming an undesirable coefficient matrix, whereby it becomes difficult to control the control target 110 to optimize the cumulative cost or the cumulative reward and stability of the control target 110 may be lost. In contrast, the policy improvement apparatus 100 may adjust the degree of change of the feedback coefficient matrix F. Therefore, the policy improvement apparatus 100 may adjust the degree of change of the feedback coefficient matrix F even at a stage when the state value function is not accurately estimated and thereby enables sudden changes of the feedback coefficient matrix F to be suppressed.

Further, the policy improvement apparatus 100 may calculate statistical values of the estimated values of the gradient function matrix $\nabla_F v(x:F)$, based on results of calculating estimated values of the gradient function matrix $\nabla_F v(x:F)$ for state of various time points. Further, the policy improvement apparatus 100 suffices to perform the input determination 1×N' times until the feedback coefficient matrix F is updated and thus, may facilitate reductions in the processing load and the processing time.

Specific examples of the control target 110 will be described with reference to FIGS. 5 to 7.

Figure 5:
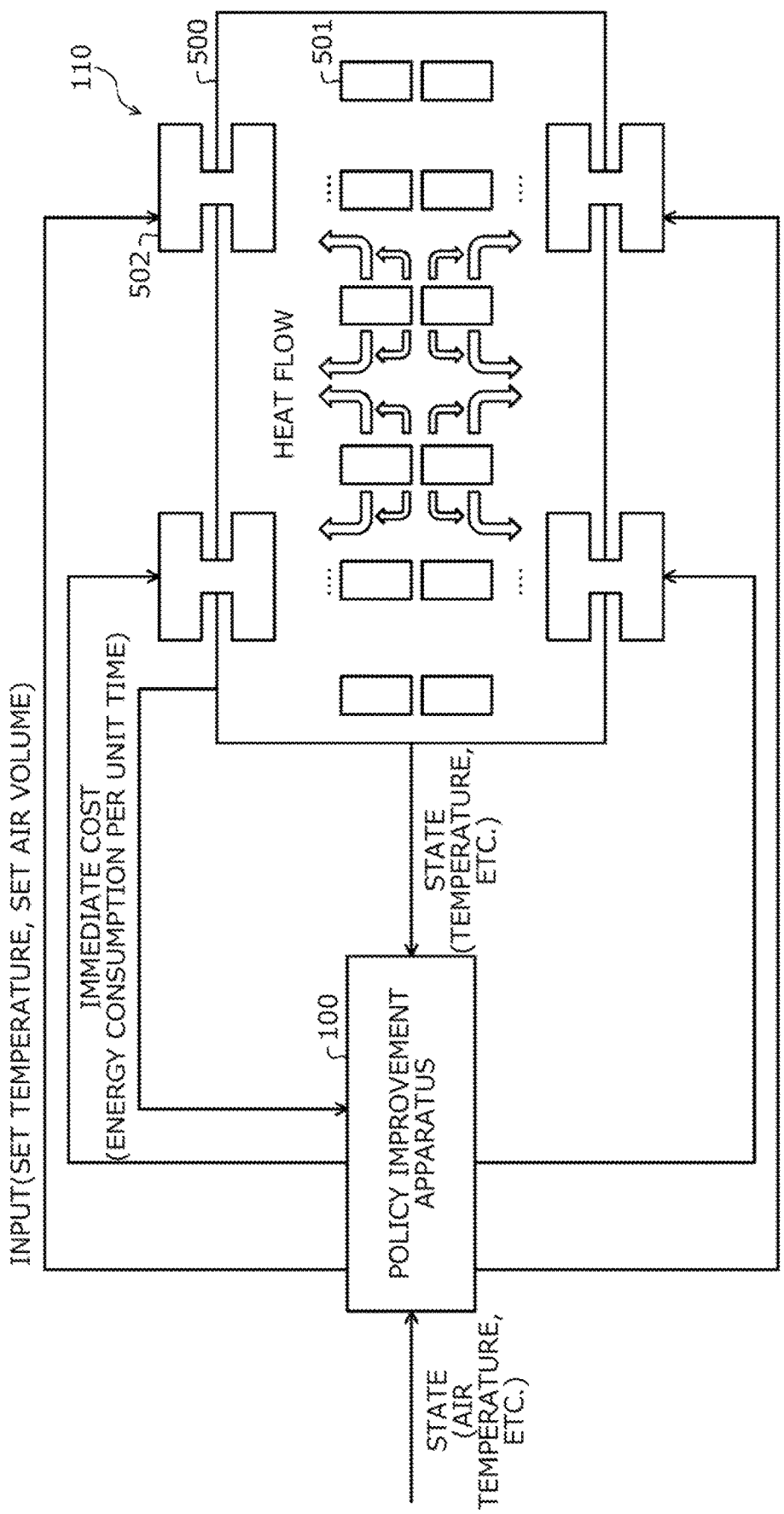
FIG. 5 is a diagram depicting a specific example of a control target 110.
Figure 6:
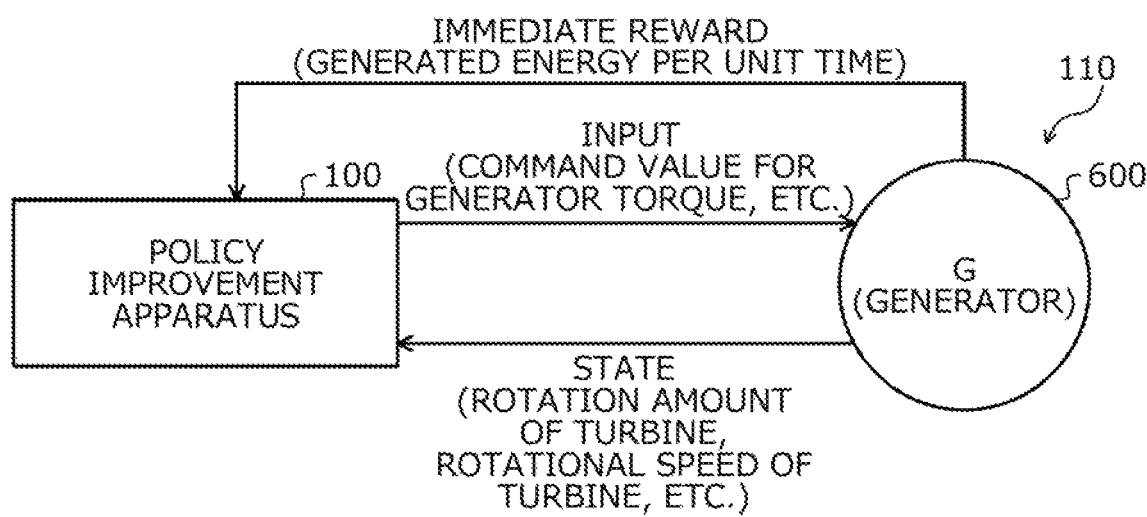
FIG. 6 is a diagram depicting a specific example of the control target 110.
Figure 7:
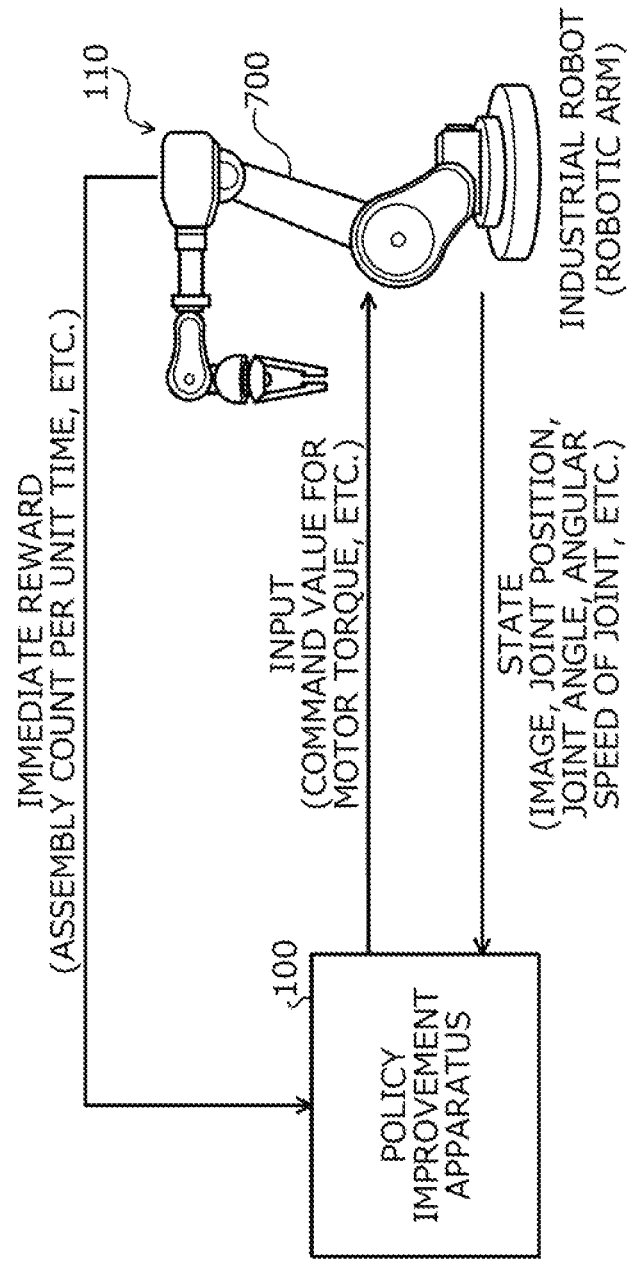
FIG. 7 is a diagram depicting a specific example of the control target 110.

FIGS. 5, 6, and 7 are diagrams depicting specific examples of the control target 110. In the example depicted in FIG. 5, the control target 110 is a server room 500 that includes a server 501 that is a heat source and a cooling device 502 such as CRAC or chiller. The input is a set temperature or a set air volume for the cooling device 502. The state is sensor data or the like from sensor equipment provided in the server room 500 and, for example, is temperature. The state may be data that is related to the control target 110 and obtained from a source other than the control target 110 and, for example, may be air temperature or the weather. The immediate cost, for example, is energy consumption per unit time of the server room 500. The unit of time, for example, is five minutes. An objective is to minimize cumulative energy consumption of the server room 500. The state value function, for example, represents a state value for the cumulative energy consumption of the server room 500.

The policy improvement apparatus 100 may update the feedback coefficient matrix F so that the cumulative energy consumption, which is the cumulative cost, is efficiently minimized. Further, the policy improvement apparatus 100 may facilitate reduction of the number of times that the input determination is performed for updating the feedback coefficient matrix F. Therefore, the policy improvement apparatus 100 may facilitate reduction of the time until the cumulative energy consumption of the control target 110 is minimized and may facilitate reduction of operating costs of the server room 500. Even when changes in air temperature and changes in the operating state of the server 501 occur, in a relatively shorter period of time from such a change, the policy improvement apparatus 100 may efficiently minimize the cumulative energy consumption.

In the example depicted in FIG. 6, the control target 110 is a power generator 600. The power generator 600, for example, is a wind power generator. The input is a command value for the power generator 600. The command value, for example, is generator torque. The state is sensor data from sensor equipment provided in the power generator 600 and, for example, is a generated energy amount of the power generator 600, a rotation amount or rotational speed of a turbine of the power generator 600, etc. The state may be wind direction or wind speed with respect to the power generator 600. The immediate reward, for example, is a generated energy amount per unit time of the power generator 600. The unit of time, for example, is five minutes. An objective, for example, is maximizing a cumulative generated energy amount of the power generator 600. The state value function, for example, represents a state value for the cumulative generated energy amount of the power generator 600.

The policy improvement apparatus 100 may update the feedback coefficient matrix F so that the cumulative generated energy amount, which is the cumulative reward, is maximized. Further, the policy improvement apparatus 100 may facilitate reduction of the number of times that the input determination is performed for updating the feedback coefficient matrix F. Therefore, the policy improvement apparatus 100 may facilitate reduction of the time until the cumulative generated energy amount of the control target 110 is maximized and may facilitate profit increases of the power generator 600. Even when a change in the state of the power generator 600 occurs, in a relatively short period of time from such a change, the policy improvement apparatus 100 may efficiently maximize the cumulative generated energy amount.

In the example depicted in FIG. 7, the control target 110 is an industrial robot 700. The industrial robot 700, for example, is a robotic arm. The input is a command value for the industrial robot 700. The command value, for example, is torque of a motor of the industrial robot 700. The state is sensor data from sensor equipment provided in the industrial robot 700 and, for example, an image taken by the industrial robot 700, a joint position, a joint angle, an angular speed of a joint, etc. of the industrial robot 700. The immediate reward, for example, is an assembly count per unit time of the industrial robot 700, etc. An objective is maximizing productivity of the industrial robot 700. The state value function, for example, represents a state value for a cumulative assembly count of the industrial robot 700.

The policy improvement apparatus 100 may update the feedback coefficient matrix F so that the cumulative assembly count, which is the cumulative reward, is maximized efficiently. Further, the policy improvement apparatus 100 may facilitate reduction of the number of times that the input determination is performed to update the feedback coefficient matrix F. Therefore, the policy improvement apparatus 100 may facilitate reduction of the time until the cumulative assembly count of the control target 110 is maximized and may facilitate profit increases of the industrial robot 700. Even when changes in the state of the industrial robot 700 occur, in a relatively shorter period of time from such a change, the policy improvement apparatus 100 may efficiently maximize the cumulative assembly count.

Further, the control target 110 may be a simulator of the specific examples described above. The control target 110 may be a power generation facility other than that for wind power generation. The control target 110, for example, may be a chemical plant or an autonomous mobile robot. Further, the control target 110 may be a game.

An example of a reinforcement learning process procedure will be described with reference to FIGS. 8 and 9.

Figure 8:
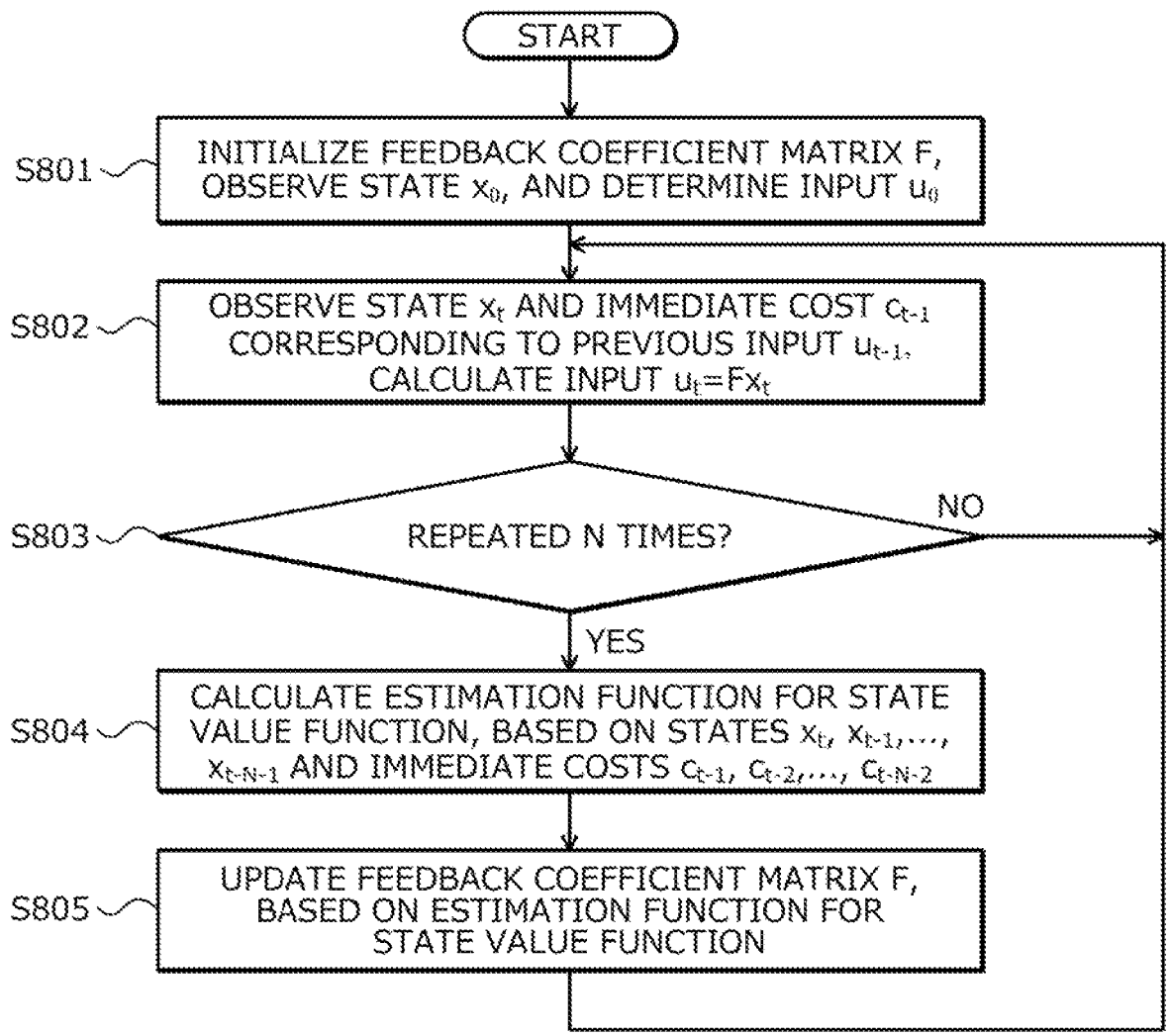
FIG. 8 is a flowchart of an example of a reinforcement learning process procedure in a form of batch processing.

FIG. 8 is a flowchart of an example of the reinforcement learning process procedure in a form of batch processing. In FIG. 8, first, the policy improvement apparatus 100 initializes the feedback coefficient matrix F, observes a state $x_0$, and determines an input $u_0$ (step S801).

Next, the policy improvement apparatus 100 observes the state $x_t$ and an immediate cost $c_{t-1}$ corresponding to a previous input $u_{t-1}$ and calculates an input $u_t = Fx_t$ (step S802). Subsequently, the policy improvement apparatus 100 decides whether step S802 has been repeated N times (step S803).

When step S802 has not been repeated N times (step S803: NO), the policy improvement apparatus 100 returns to the operation at step S802. On the other hand, when step S802 has been repeated N times (step S803: YES), the policy improvement apparatus 100 transitions to an operation at step S804.

At step S804, the policy improvement apparatus 100 calculates an estimation function for the state value function, based on states $x_t, x_{t-1}, \ldots, x_{t-N-1}$ and immediate costs $c_{t-1}, c_{t-2}, \ldots, c_{t-N-2}$ (step S804).

Next, the policy improvement apparatus 100 updates the feedback coefficient matrix F, based on the estimation function for the state value function (step S805). An example of updating the feedback coefficient matrix F will be described, in particular, with reference to FIG. 10 hereinafter. The policy improvement apparatus 100, then, returns to the operation at step S802. As a result, the policy improvement apparatus 100 may control the control target 110.

Figure 9:
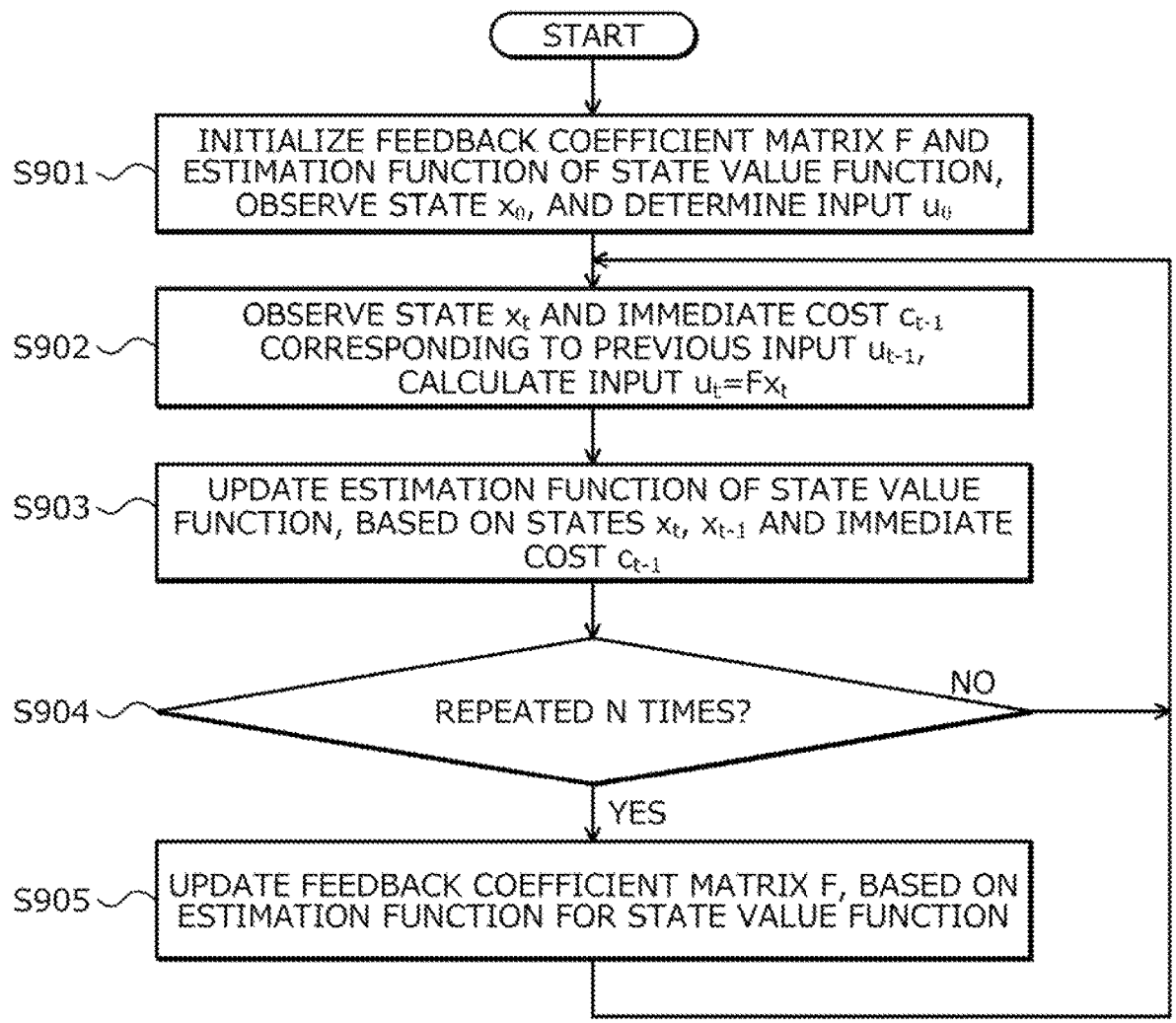
FIG. 9 is a flowchart of an example of the reinforcement learning process procedure in a form of sequential processing.

FIG. 9 is a flowchart of an example of the reinforcement learning process procedure in a form of sequential processing. In FIG. 9, first, the policy improvement apparatus 100 initializes the feedback coefficient matrix F and the estimation function of the state value function, observes the state $x_0$, and determines the input $u_0$ (step S901).

Next, the policy improvement apparatus 100 observes the state $x_t$ and the immediate cost $c_{t-1}$ corresponding to the previous input $u_{t-1}$ and calculates the input $u_t = Fx_t$ (step S902). Subsequently, the policy improvement apparatus 100 updates the estimation function of the state value function, based on the states $x_t, x_{t-1}$ and the immediate cost $c_{t-1}$ (step S903).

Next, the policy improvement apparatus 100 decides whether step S903 has been repeated N times (step S904). Here, when step S903 has not been repeated N times (step S904: NO), the policy improvement apparatus 100 returns to the operation at step S902. On the other hand, when step S903 has been repeated N times (step S904: YES), the policy improvement apparatus 100 transitions to an operation at step S905.

At step S905, the policy improvement apparatus 100 updates the feedback coefficient matrix F, based on the estimation function for the state value function (step S905). An example of updating the feedback coefficient matrix F will be described, in particular, with reference to FIG. 10 hereinafter. The policy improvement apparatus 100, then, returns to the operation at step S902. As a result, the policy improvement apparatus 100 may control the control target 110.

Figure 10:
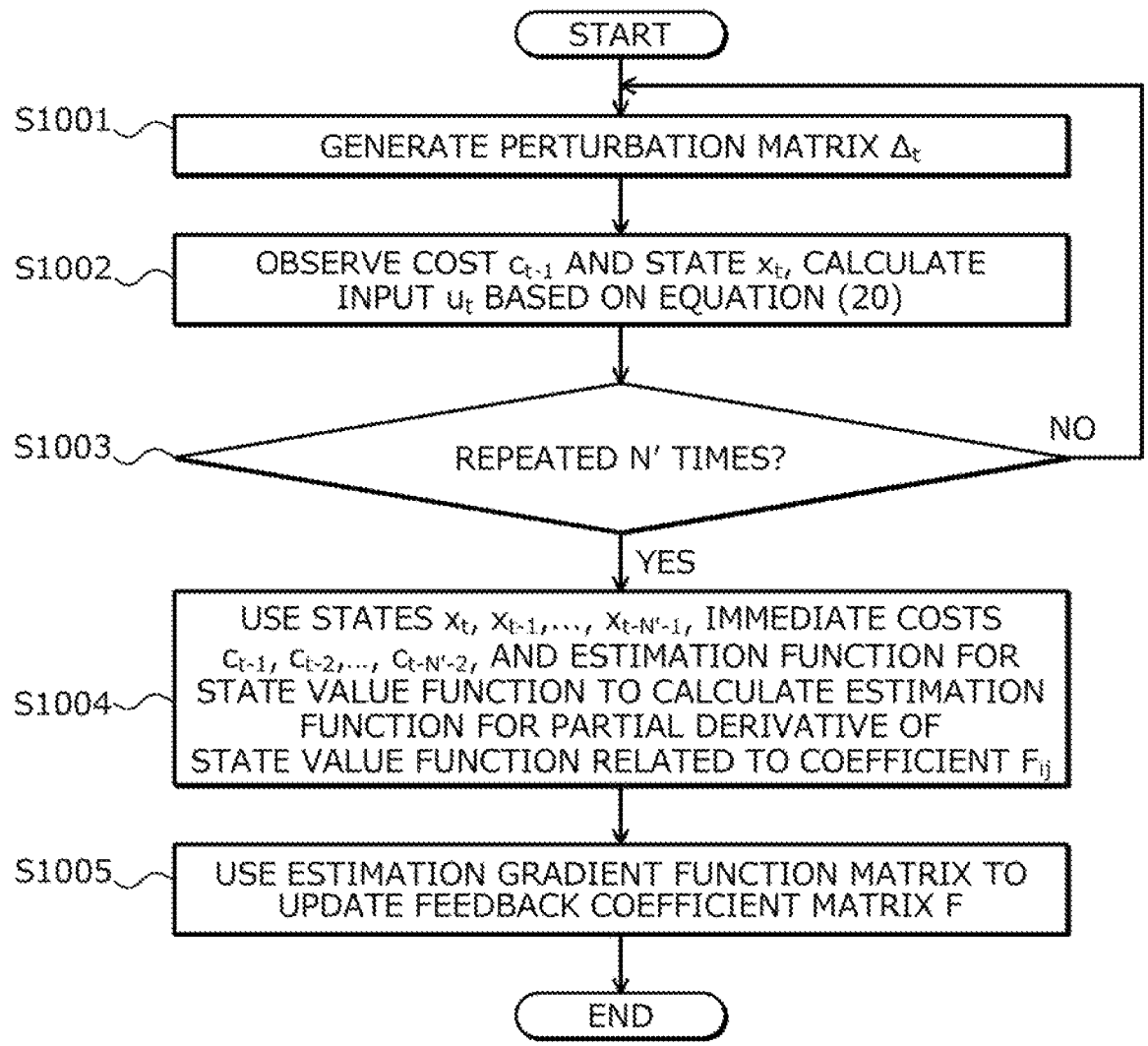
FIG. 10 is a flowchart of an example of a policy improvement process procedure.

With reference to FIG. 10, an example of a policy improvement process procedure that is a specific example of step S805 where the policy improvement apparatus 100 updates the feedback coefficient matrix F and improves the policy. A specific example of step S905 is similar to the specific example of step S805.

FIG. 10 is a flowchart of an example of the policy improvement process procedure. In FIG. 10, a perturbation matrix $\Delta_t$ is generated (step S1001). Subsequently, the policy improvement apparatus 100 observes the cost $c_{t-1}$ and the state $x_t$, and calculates the input $u_t$, based on equation (20) (step S1002).

$$u_t = (F + \in \Delta_t)x_t \quad (20)$$

Next, the policy improvement apparatus 100 decides whether step S1002 has been repeated N' times (step S1003). Here, when step S1002 has not been repeated N' times (step S1003: NO), the policy improvement apparatus 100 returns to the operation at step S1001. On the other hand, when step S1002 has been repeated N' times (step S1003: YES), the policy improvement apparatus 100 transitions to an operation at step S1004.

At step S1004, the policy improvement apparatus 100 uses the states $x_t, x_{t-1}, \ldots, x_{t-N'-1}$, the immediate costs $c_{t-1}, c_{t-2}, \ldots, c_{t-N'-2}$, and the estimation function for the state value function to calculate an estimation function for a partial derivative of the state value function with respect to the coefficient $F_{ij}$ (step S1004). An example of calculation of the estimation function for the partial derivative of the state value function with respect to the coefficient $F_{ij}$ will be described, in particular, with reference to FIG. 11 hereinafter.

Next, the policy improvement apparatus 100 uses the estimation gradient function matrix to update the feedback coefficient matrix F (step S1005). An example of updating the feedback coefficient matrix F will be described, in particular, with reference to FIG. 12 hereinafter. The policy improvement apparatus 100, then, terminates the policy improvement process.

Figure 11:
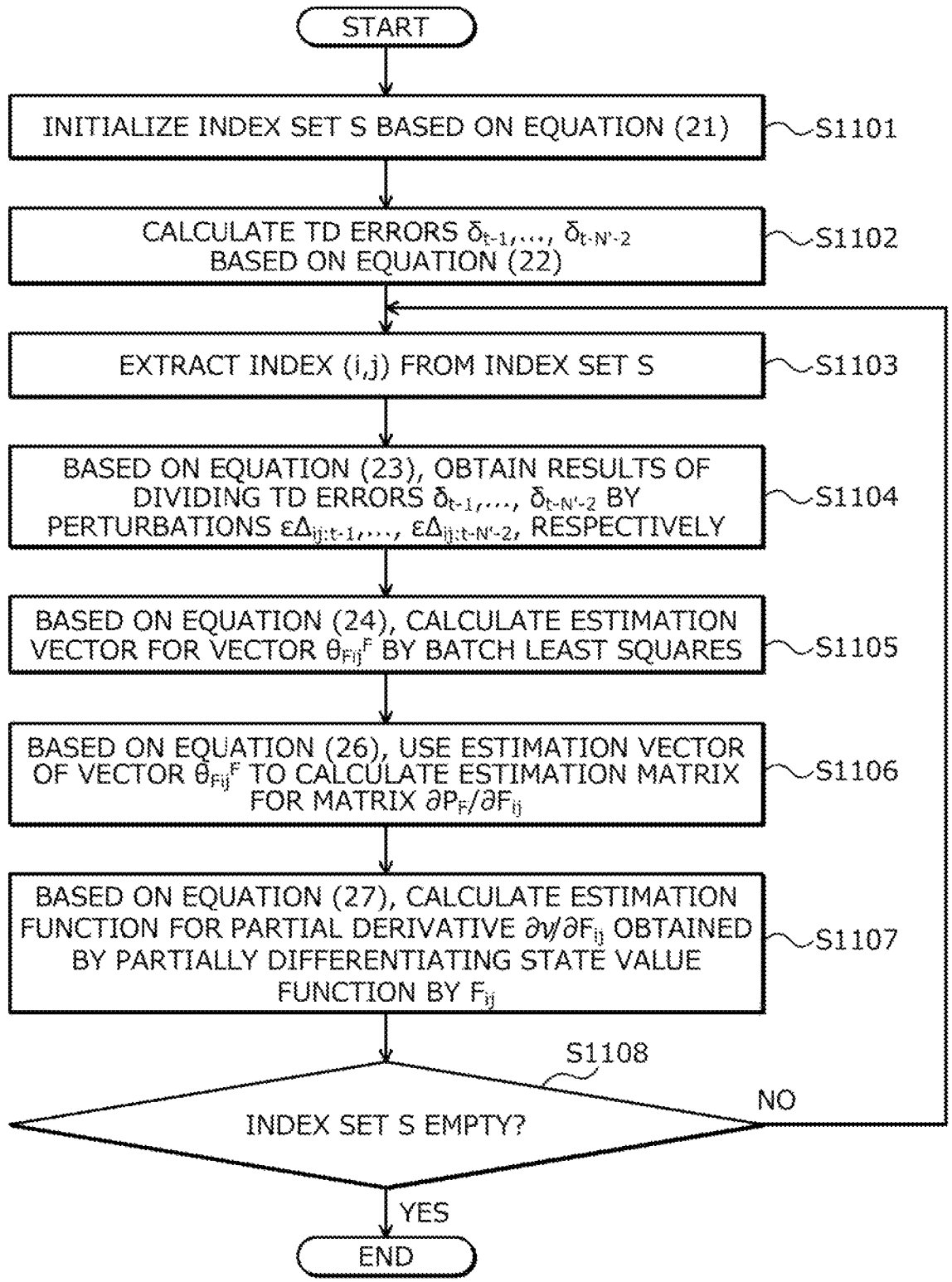
FIG. 11 is a flowchart of an example of an estimation process procedure.

With reference to FIG. 11, an example of an estimation process procedure that is a specific example of step S1005 where the estimation function of the partial derivative of the state value function with respect to the coefficient $F_{ij}$ is calculated.

FIG. 11 is a flowchart of an example of the estimation process procedure. In FIG. 11, first, the policy improvement apparatus 100 initializes an index set S based on equation (21) (step S1101).

$$S = \{(i,j) | i \in \{1,2,\ldots,m\}, j \in \{1,2,\ldots,n\}\} \quad (21)$$

(i,j) is an index specifying a matrix component. The index (i,j), for example, specifies a component of an i-th row and a j-th column. In the description hereinafter, m is the number of rows in the feedback coefficient matrix F and n is the number of columns in the feedback coefficient matrix F.

Next, the policy improvement apparatus 100 calculates TD errors $\delta_{t-1}, \ldots, \delta_{t-N'-2}$, based on equation (22) (step S1102).

$$\delta_{t-1} := c_{t-1} - \{\hat{v}(x_{t-1}:F) - \gamma \hat{v}(x_t:F)\} \quad (22)$$
$$\delta_{t-2} := c_{t-2} - \{\hat{v}(x_{t-2}:F) - \gamma \hat{v}(x_{t-1}:F)\}$$
$$\vdots$$
$$\delta_{t-N'-2} := c_{t-N'-2} - \{\hat{v}(x_{t-N'-2}:F) - \gamma \hat{v}(x_{t-N'-1}:F)\}$$

Subsequently, the policy improvement apparatus 100 extracts an index (i,j) from the index set S (step S1103).

Next, the policy improvement apparatus 100 obtains results of dividing the TD errors $\delta_{t-1}, \ldots, \delta_{t-N'-2}$ by perturbations $\varepsilon\Delta_{ij:t-1}, \ldots, \varepsilon\Delta_{ij:t-N'-2}$, respectively, based on equation (23) (step S1104).

$$\frac{1}{\varepsilon\Delta_{ij:t-1}}\delta_{t-1}, \frac{1}{\varepsilon\Delta_{ij:t-1}}\delta_{t-2}, \cdots \frac{1}{\varepsilon\Delta_{ij:t-N'-2}}\delta_{t-N'-2} \quad (23)$$

Next, based on batch least squares, the policy improvement apparatus 100 calculates an estimation vector for a vector $\theta_{Fij}^F$ by equation (24) (step S1105).

$$\hat{\theta}_{F_{ij}}^F := \begin{bmatrix} \{(x_{t-1} \otimes x_{t-1}) - \gamma(x_t \otimes x_t)\}^T \\ \{(x_{t-2} \otimes x_{t-2}) - \gamma(x_{t-1} \otimes x_{t-1})\}^T \\ \vdots \\ \{(x_{t-N'-2} \otimes x_{t-N'-2}) - \gamma(x_{t-N'-1} \otimes x_{t-N'-1})\}^T \end{bmatrix}^\dagger \quad (24)$$

$$\begin{bmatrix} \frac{1}{\varepsilon\Delta_{ij:t-1}}\delta_{t-1} \\ \frac{1}{\varepsilon\Delta_{ij:t-2}}\delta_{t-2} \\ \vdots \\ \frac{1}{\varepsilon\Delta_{ij:t-N'-2}}\delta_{t-N'-2} \end{bmatrix}$$

T indicates transposition. The symbol in which "o" and "x" are superimposed on each other represents the Kronecker product. † represents Moore-Penrose generalized inverse of a matrix.

Equation (24) is obtained by forming an approximate equality of a mathematical product of a vector corresponding to equation (23) and a matrix dependent on a state defined by equation (25) and a vector independent of the state $\theta_{Fij}^F$, and applying batch least squares to the approximate equality.

$$\begin{bmatrix} \{(x_{t-1} \otimes x_{t-1}) - \gamma(x_t \otimes x_t)\}^T \\ \{(x_{t-2} \otimes x_{t-2}) - \gamma(x_{t-1} \otimes x_{t-1})\}^T \\ \vdots \\ \{(x_{t-N'-2} \otimes x_{t-N'-2}) - \gamma(x_{t-N'-1} \otimes x_{t-N'-1})\}^T \end{bmatrix} \quad (25)$$

Here, the mathematical product of the estimation vector of the vector independent of the state $\theta_{Fij}^F$ and a matrix dependent on a state defined by equation (25) corresponds to a result of differentiating the state value function by the (i,j) component of the feedback coefficient matrix F.

Next, the policy improvement apparatus 100 uses the estimation vector of the vector $\theta_{Fij}^F$ to generate an estimation matrix for the matrix $\partial P_F/\partial F_{ij}$, based on equation (26) (step S1106).

$$\frac{\widehat{\partial P}_F}{\partial F_{ij}} := vec_{n \times n}^{-1}(\hat{\theta}_{F_{ij}}^F) \quad (26)$$

$vec^{-1}$ is a symbol for reverse conversion of a vector into a matrix.

Next, based on equation (27), the policy improvement apparatus 100 calculates an estimation function for the partial derivative $\partial v/\partial F_{ij}$ obtained by partially differentiating the state value function by $F_{ij}$ (step S1107).

$$\frac{\widehat{\partial v}}{\partial F_{ij}}(x:F) := x^T \frac{\widehat{\partial P}_F}{\partial F_{ij}} x \quad (27)$$

Subsequently, the policy improvement apparatus 100 decides whether the index set S is empty (step S1108). Here, when the index set S is not empty (step S1108: NO), the policy improvement apparatus 100 returns to the operation at step S1103. On the other hand, when the index set S is empty (step S1108: YES), the policy improvement apparatus 100 terminates the estimation process.

Figure 12:
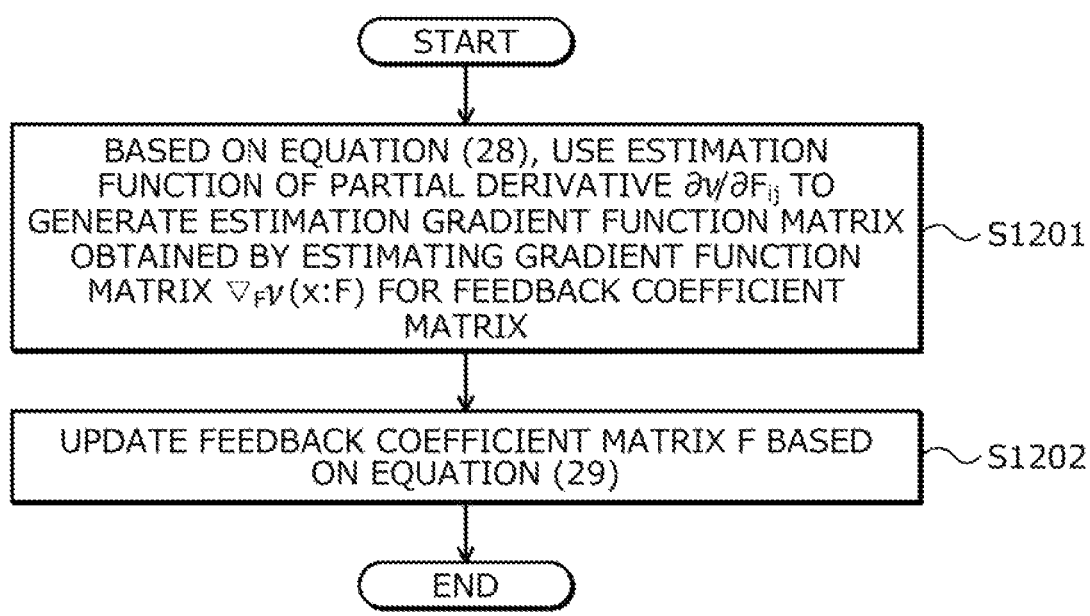
FIG. 12 is a flowchart of an example of an updating process procedure.

With reference to FIG. 12, an example of an updating process procedure that is a specific example of step S1005 where the policy improvement apparatus 100 updates the feedback coefficient matrix F will be described.

FIG. 12 is a flowchart of an example of the updating process procedure. In FIG. 12, first, based on equation (28), the policy improvement apparatus 100 uses the estimation function of the partial derivative $\partial v/\partial F_{ij}$ and generates the estimation gradient function matrix obtained by estimating the gradient function matrix $\nabla_F v(x:F)$ for the feedback coefficient matrix (step S1201).

$$\widehat{\nabla_F v}(x:F) = \begin{pmatrix} x^T \frac{\widehat{\partial P}_F}{\partial F_{11}} x & \cdots & x^T \frac{\widehat{\partial P}_F}{\partial F_{1n}} x \\ \vdots & \ddots & \vdots \\ x^T \frac{\widehat{\partial P}_F}{\partial F_{m1}} x & \cdots & x^T \frac{\widehat{\partial P}_F}{\partial F_{mn}} x \end{pmatrix} \quad (28)$$

$$= \begin{pmatrix} (x \otimes x)^T \hat{\theta}_{F_{11}}^F & \cdots & (x \otimes x)^T \hat{\theta}_{F_{1n}}^F \\ \vdots & \ddots & \vdots \\ (x \otimes x)^T \hat{\theta}_{F_{m1}}^F & \cdots & (x \otimes x)^T \hat{\theta}_{F_{mn}}^F \end{pmatrix}$$

$$= \begin{pmatrix} (x \otimes x)^T & \cdots & O \\ \vdots & \ddots & \vdots \\ O & \cdots & (x \otimes x)^T \end{pmatrix} \begin{pmatrix} \hat{\theta}_{F_{11}}^F & \cdots & \hat{\theta}_{F_{1n}}^F \\ \vdots & \ddots & \vdots \\ \hat{\theta}_{F_{m1}}^F & \cdots & \hat{\theta}_{F_{mn}}^F \end{pmatrix}$$

$$= (I \otimes (x \otimes x)^T) \begin{pmatrix} \hat{\theta}_{F_{11}}^F & \cdots & \hat{\theta}_{F_{1n}}^F \\ \vdots & \ddots & \vdots \\ \hat{\theta}_{F_{m1}}^F & \cdots & \hat{\theta}_{F_{mn}}^F \end{pmatrix}$$

Next, the policy improvement apparatus 100 updates the feedback coefficient matrix F, based on equation (29) (step S1202).

$$F \leftarrow F - \alpha \left( \sum_{k=1}^M \widehat{\nabla_F v}(x^{[k]} : F) \right) \quad (29)$$

$\alpha$ is a weight. Subsequently, the policy improvement apparatus 100 terminates the updating process. As a result, the policy improvement apparatus 100 improves the state value function and may update the feedback coefficient matrix F so that the cumulative cost and/or the cumulative reward are optimized efficiently. Further, the policy improvement apparatus 100 may generate the estimation gradient function matrix in which an arbitrary state x is substitutable.

Herein, while a case has been described in which the policy improvement apparatus 100 realizes reinforcement learning that is based on immediate cost, without limitation hereto, for example, the policy improvement apparatus 100 may realize reinforcement learning that is based on immediate reward. In this case, the policy improvement apparatus 100 uses equation (30) instead of equation (29).

$$F \leftarrow F + \alpha \left( \sum_{k=1}^{M} \overline{\nabla_F v}(x^{[k]} : F) \right) \quad (30)$$

Herein, while a case has been described in which the policy improvement apparatus 100 adds perturbations to all components of the feedback coefficient matrix F, without limitation hereto, for example, the policy improvement apparatus 100 may divide the components of the feedback coefficient matrix F into groups and add perturbations to the components, for each group. A group, for example, is a group of components in units of rows or a group of components in units of columns. The group, for example, may be a group of components of an upper triangular part and/or a lower triangular part. In this case as well, the perturbations, similarly, are determined based on the first property and the second property described above. In this case, the policy improvement apparatus 100 executes the process depicted in FIG. 11 for each group and thereby, calculates an estimation function for the partial derivative ∂v/∂$F_{ij}$ obtained by partially differentiating the state value function by $F_{ij}$.

As described above, according to the policy improvement apparatus 100, perturbations may be added to plural components of the first parameter of the policy. According to the policy improvement apparatus 100, the gradient function of the state value function with respect to the first parameter may be estimated based on a result of determining input for the control target 110, by the policy that uses the second parameter that is obtained by adding the perturbations to the components. According to the policy improvement apparatus 100, the first parameter may be updated by using the estimated gradient function. As a result, the policy improvement apparatus 100 may facilitate a reduction in the number of times that the input determination is performed for updating of the feedback coefficient matrix and may facilitate a reduction in the number of times that the process of standing by for a predetermined period corresponding to the input determination and observing the immediate cost or the immediate reward is performed. Therefore, the policy improvement apparatus 100 may facilitate reductions in the processing load and the processing time.

According to the policy improvement apparatus 100, perturbations may be added to all of the components of the first parameter. As a result, the policy improvement apparatus 100 may further reduce the number of times that the input determination is performed for updating the feedback coefficient matrix.

According to the policy improvement apparatus 100, the perturbation added to each of the multiple components may be determined independently for each component and maybe determined so that the probabilities of the perturbation having a positive value or a negative value are equal where the absolute values of the positive value and the negative value are equal. As a result, the policy improvement apparatus 100 may accurately update the feedback coefficient matrix.

According to the policy improvement apparatus 100, the input determination may be performed repeatedly for the control target 110 by the policy that uses the second parameter that is obtained by adding perturbations to the components of the first parameter. According to the policy improvement apparatus 100, the gradient function may be estimated based on the results obtained for each of the input determinations for the control target 110. As a result, the policy improvement apparatus 100 may accurately update the feedback coefficient matrix.

According to the policy improvement apparatus 100, based on a result obtained for each execution of the input determination for the control target 110, TD errors corresponding to the input determinations, respectively, may be calculated. According to the policy improvement apparatus 100, for each of the components of the first parameter, the corresponding TD error for the input determination may be divided by the corresponding perturbation added to the component. According to the policy improvement apparatus 100, the obtained quotients and results of differentiating the state value function by each component may be associated and the gradient function may be estimated. As a result, the policy improvement apparatus 100 may generate the estimation gradient function matrix in a format that enables substitution of the state.

According to the policy improvement apparatus 100, air conditioning equipment may be set as the control target 110. As a result, the policy improvement apparatus 100 may control the air conditioning equipment.

According to the policy improvement apparatus 100, a power generation facility may be set as the control target 110. As a result, the policy improvement apparatus 100 may control the power generation facility.

According to the policy improvement apparatus 100, an industrial robot may be set as the control target 110. As a result, the policy improvement apparatus 100 may control the industrial robot.

The policy improvement method described in the present embodiments may be implemented by executing a prepared program on a computer such as a personal computer and a workstation. The policy improvement program described in the present embodiments is stored on a non-transitory, computer-readable recording medium such as a hard disk, a flexible disk, a CD-ROM, an MO, and a DVD, read out from the computer-readable medium, and executed by the computer. The policy improvement program described in the present embodiments may be distributed through a network such as the Internet.

According to one aspect, a reduction in the number of times that input determination is performed to update a parameter becomes possible.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A policy improvement method of improving a policy of reinforcement learning by a state value function, the policy improvement method executed by a computer and comprising:
adding, by the computer, a plurality of perturbations to a plurality of components of a first parameter of the policy;
estimating, by the computer, a gradient function of the state value function with respect to the first parameter, based on a result of an input determination performed for a control target in the reinforcement learning, the input determination being performed by using the policy that uses a second parameter obtained by adding the plurality of perturbations to the plurality of components; and
updating, by the computer, the first parameter based on the estimated gradient function, wherein
the perturbations respectively added to the plurality of components are determined independently of each other and are determined so that probabilities of a perturbation having a positive value or a negative value are equal where an absolute value of the positive value and an absolute value of the negative value are equal.

2. The policy improvement method according to claim 1, wherein
adding the perturbations includes adding the perturbations to all components of the plurality of components of the first parameter.

3. The policy improvement method according to claim 1, wherein
the adding the perturbations includes:
adding the perturbations to the plurality of components of the first parameter to obtain the second parameter and performing the input determination for the control target by the policy that uses the second parameter, and
estimating the gradient function includes estimating the gradient function based on results obtained respectively for the plurality of executions of the input determination performed for the control target.

4. The policy improvement method according to claim 3, wherein
the estimating the gradient function includes:
calculating a corresponding TD error for each of the plurality of executions, based on the results obtained respectively for the plurality of executions of the input determination performed for the control target,
with respect to one of the plurality of executions, a quotient is obtained for each component of the plurality of components by dividing the corresponding TD error by a perturbation added to the component among the perturbations, and
the quotient obtained for each component of the plurality of components is associated with a result of differentiating the state value function by the component and the gradient function is estimated.

5. The policy improvement method according to claim 1, wherein
the control target is an air conditioning equipment, and
the reinforcement learning sets any one of a set temperature of the air conditioning equipment and a set air volume of the air conditioning equipment as an input, sets any one of a temperature in a room having the air conditioning equipment, a temperature outside the room having the air conditioning equipment, and weather as a state, and sets energy consumption of the air conditioning equipment as cost.

6. The policy improvement method according to claim 1, wherein
the control target is a power generation facility, and
the reinforcement learning sets torque of a generator of the power generation facility as input, sets any one of a generated energy amount of the power generation facility, a rotation amount of a turbine of the power generation facility, a rotational speed of the turbine of the power generation facility, a wind direction with respect to the power generation facility, and a wind speed with respect to the power generation facility as a state, and sets the generated energy amount of the power generation facility as a reward.

7. The policy improvement method according to claim 1, wherein
the control target is an industrial robot, and
the reinforcement learning sets torque of a motor of the industrial robot as input, sets any one of an image taken by the industrial robot, a position of a joint of the industrial robot, an angle of the joint of the industrial robot, and angular speed of the joint of the industrial robot as a state, and sets a production amount of the industrial robot as a reward.

8. The policy improvement method according to claim 1, wherein
a state change of the control target is represented by a linear difference equation, and an immediate cost or an immediate reward of the control target is represented by a quadratic form of a state and an input.

9. A non-transitory computer-readable medium storing therein a policy improvement program that improves a policy of reinforcement learning by a state value function and causes a computer to execute a process, the process comprising:
adding, by the computer, a plurality of perturbations to a plurality of components of a first parameter of the policy;
estimating, by the computer, a gradient function of the state value function with respect to the first parameter, based on a result of an input determination performed for a control target in the reinforcement learning, the input determination being performed by using the policy that uses a second parameter obtained by adding the plurality of perturbations to the plurality of components; and
updating, by the computer, the first parameter based on the estimated gradient function, wherein
the perturbations respectively added to the plurality of components are determined independently of each other and are determined so that probabilities of a perturbation having a positive value or a negative value are equal where an absolute value of the positive value and an absolute value of the negative value are equal.

10. A policy improvement apparatus that improves a policy of reinforcement learning by a state value function, the policy improvement apparatus comprising:
a memory; and
a processor coupled to the memory, the processor configured to:
add a plurality of perturbations to a plurality of components of a first parameter of the policy;
estimate a gradient function of the state value function with respect to the first parameter, based on a result of an input determination performed for a control target in the reinforcement learning, the input determination being performed by using the policy that uses a second parameter obtained by adding the plurality of perturbations to the plurality of components; and updating the first parameter based on the estimated gradient function, wherein the perturbations respectively added to the plurality of components are determined independently of each other and are determined so that probabilities of a perturbation having a positive value or a negative value are equal where an absolute value of the positive value and an absolute value of the negative value are equal.

* * * * *